(12) United States Patent
Heilman et al.

(10) Patent No.: US 11,431,191 B2
(45) Date of Patent: Aug. 30, 2022

(54) METHODS AND SYSTEMS FOR PROVIDING POWER

(71) Applicant: EXELON GENERATION COMPANY, LLC, Kennett Square, PA (US)

(72) Inventors: David D. Heilman, Geneseo, IL (US); Justin R. Smith, Bettendorf, IA (US)

(73) Assignee: Constellation Energy Generation, LLC, Kennett Square, PA (US)

( * ) Notice: Subject to any disclaimer, the term of this patent is extended or adjusted under 35 U.S.C. 154(b) by 0 days.

(21) Appl. No.: 16/521,200

(22) Filed: Jul. 24, 2019

(65) Prior Publication Data

US 2021/0028646 A1 Jan. 28, 2021

(51) Int. Cl.
*H02J 9/00* (2006.01)
*H02J 7/00* (2006.01)
*H02J 9/06* (2006.01)
*H02J 7/02* (2016.01)

(52) U.S. Cl.
CPC ............... *H02J 9/062* (2013.01); *H02J 7/02* (2013.01); *H02J 9/066* (2013.01)

(58) Field of Classification Search
CPC .... H02J 9/062; H02J 9/066; H02J 7/02; H02J 9/061
See application file for complete search history.

(56) References Cited

U.S. PATENT DOCUMENTS

| 4,163,134 | A | 7/1979 | Budrose |
| 5,022,587 | A | 6/1991 | Hochstein |
| 5,939,799 | A | 8/1999 | Weinstein |
| 7,298,627 | B2 | 11/2007 | Hussaini et al. |
| 7,353,841 | B2 | 4/2008 | Kono et al. |
| 9,225,202 | B1* | 12/2015 | Kim .......................... H02J 9/08 |
| 9,583,942 | B2 | 2/2017 | Czarnecki |
| 9,774,190 | B2 | 9/2017 | Mondal |
| 9,929,592 | B2 | 3/2018 | Liao et al. |
| 10,879,727 | B1* | 12/2020 | Cooper .................. H02J 3/007 |
| 2006/0104836 | A1 | 5/2006 | Phillips |
| 2007/0262641 | A1* | 11/2007 | Stone ........................ H02J 7/02 307/10.1 |
| 2007/0285049 | A1 | 12/2007 | Krieger et al. |
| 2008/0278003 | A1* | 11/2008 | Pouchet .................. H02J 9/062 307/66 |
| 2010/0045107 | A1* | 2/2010 | Cohen ..................... H02J 9/062 307/23 |
| 2011/0175451 | A1* | 7/2011 | Moon ..................... H02J 3/381 307/66 |
| 2016/0126787 | A1* | 5/2016 | Liao ........................ H02J 9/005 307/66 |
| 2018/0323641 | A1* | 11/2018 | Lee ......................... H02J 9/061 |
| 2019/0036724 | A1 | 1/2019 | Stiefenhofer |

OTHER PUBLICATIONS

International Search Report and Written Opinion issued in related application No. PCT/US20/43422 dated Dec. 18, 2020.
International Search Report and Written Opinion issued in related application No. PCT/US21/54561 dated Mar. 1, 2022.

* cited by examiner

*Primary Examiner* — Rexford N Barnie
*Assistant Examiner* — Rasem Mourad
(74) *Attorney, Agent, or Firm* — Ballard Spahr LLP

(57) ABSTRACT

Systems and methods are described for providing power. A system comprising a generator, an inverter, and a battery can be used to provide power. The system can also comprise a transfer switch. The system can provide power to another device.

37 Claims, 19 Drawing Sheets

METHODS AND SYSTEMS FOR PROVIDING POWER

BACKGROUND

Generally, electrical power is needed to control most functions within a commercial industrial plant/facility. Further, these plants and facilities have critical safety functions that must be maintained in the event of a loss of electrical power to avoid safety degradation or damage. For example, during postulated accident scenarios nuclear power plants need certain systems to continuously maintain power to safely shut the plant down and avoid the potential for core damage. As another example, industrial chemical plants need to maintain control of critical chemical process to avoid explosions and/or chemical spills. Thus, many commercial industrial plants/facilities require backup generators that provide emergency power to large portions of plant/facility equipment in case of a loss of normal electrical supply power. However, for many of these plants/facilities', emergency backup power is needed for various critical smaller electrical loads that operate at a range of AC and DC voltages and currents to control, operate, and monitor the most important critical equipment to facilitate safe shutdown and avoid large scale accident and damage. During these loss of power events time is of the essence and it is imperative to restore power to these critical smaller electrical loads as quickly and simply as possible to mitigate the event and minimize any damage caused by loss of power.

For example, during extreme accident scenarios and natural disaster events nuclear power plants have specific time requirements that electrical power must be returned to critical equipment (e.g., equipment that provides critical cooling functions to prevent damage or escalating the event). During extreme accident scenarios if the critical equipment loses offsite grid power and the installed backup generators also fail, a nuclear power plant may have a very short time frame, as in a matter of hours, before severe damage to the facility occurs. This scenario was exemplified in the 2011 Fukushima-Diachi earthquake and resultant nuclear accident. Therefore, there is a critical need to ensure that nuclear power plants do not go without main or backup emergency power to their critical safety equipment for a certain number of hours.

While nuclear power plants are designed with emergency backup power systems utilizing one or more large installed generators, the installations are complex and difficult to maintain, have limited fuel supply for prolonged events, and the installed large backup generator installations may be impacted in a natural disaster or hampered by an extended loss of electrical grid event. To address this concern, the US Nuclear Industry and U.S. Nuclear Regulatory Commission implemented a Diverse and Flexible Mitigation Capability ("FLEX") strategy to ensure that nuclear power plants receive power beyond their main and installed emergency power systems in a case of an extended loss of power event. Generally, the FLEX strategy provides for a third form of emergency power through large portable machinery and power generators that nuclear power plants can utilize in case of an extended loss of power. Additional FLEX equipment is dispersed throughout the United States in strategic locations to service as many nuclear power plants as possible, while at the same time ensuring that a natural disaster does not damage more than one FLEX storage location. However, the FLEX strategy is extremely expensive to maintain, somewhat complex to implement during an extreme event, and could experience a significant delay in mobilizing FLEX equipment to provide power to the nuclear facilities during a very large-scale natural disaster event or terrorist type event affecting regional or national power grids. Furthermore, the FLEX equipment is designed to provide power to the entire nuclear power plant (e.g., just like a large backup generator), and not just target critical pieces of equipment that need power to maintain the safety of the nuclear power plant. For example, a nuclear power plant may only need to provide power to three (3) pieces of equipment and/or components to maintain the safety of the core, while the rest of the nuclear power plant can safely remain without power.

Accordingly, there is a long felt need in the nuclear power industry to be able to provide emergency power response in a much more quick and efficient manner to the most critical pieces of equipment. Thus, the need for a targeted, quick response backup power for critical equipment in the nuclear plant and in other commercial plant/facilities is evident. These long felt needs are addressed by the disclosure herein. Specifically, the exemplary embodiments herein provide several systems and methods for rapidly deploying a portable power device to restore power to critical smaller electrical loads (both AC and DC power), regardless of status of industrial plant's/facility's main or installed backup up power source or distribution system. These system's and method's not only supply a targeted third tier backup power source but provide a means for prolonged power in the most severe accident and natural accident scenarios and can be applied for a variety of facilities and industrial plants.

SUMMARY

It is to be understood that both the following general description and the following detailed description are exemplary and explanatory only and are not restrictive. Provided are systems, apparatuses, and methods for protecting various critical instrumentation and control circuits, as well as power circuits, when a primary power source fails (e.g., is disrupted).

In an exemplary embodiment, a system comprises a generator, a rectifier, a battery, and a distribution hub. The generator can provide power to the rectifier. The rectifier can be an Alternating Current (AC) to Direct Current (DC) inverter and/or a DC to AC converter. The rectifier can provide power received from the generator to the battery, as well as the distribution hub. Additionally, the rectifier can receive power only from the supplied battery and provide the power received from the battery to the distribution hub. The distribution hub can distribute the power to one or more power providing devices.

In another exemplary embodiment, a system comprises a generator, a transfer switch, a rectifier, a battery, and a control module. The generator can provide power to the transfer switch. The transfer switch can provide power to the rectifier and the control module. The rectifier can be an AC to DC inverter and/or a DC to AC converter. The rectifier can provide power received from the transfer switch to the battery, as well as the control module. Additionally, the rectifier can receive power from the battery and provide the power received from the battery to the transfer switch and the control module. The control module can output the power received from the transfer switch. The control module can have two or more DC outputs. The control module can have two or more AC outputs.

In another exemplary embodiment, an apparatus comprises a battery, a rectifier, a variable frequency drive, and a reversing contactor. The battery can provide power to the rectifier. The rectifier can be an AC to DC inverter and/or a DC to AC converter. The rectifier can provide power to the variable frequency drive and can provide control power to another device. The variable frequency drive can receive the AC power from the rectifier and convert the AC power to three-phase AC power. The variable frequency drive can provide the three-phase AC power to a reversing contactor switch, which can modify the polarity of the three-phase AC power. The reversing contactor switch can provide the three-phase AC power to an output.

Additional advantages will be set forth in part in the description which follows or can be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1A:
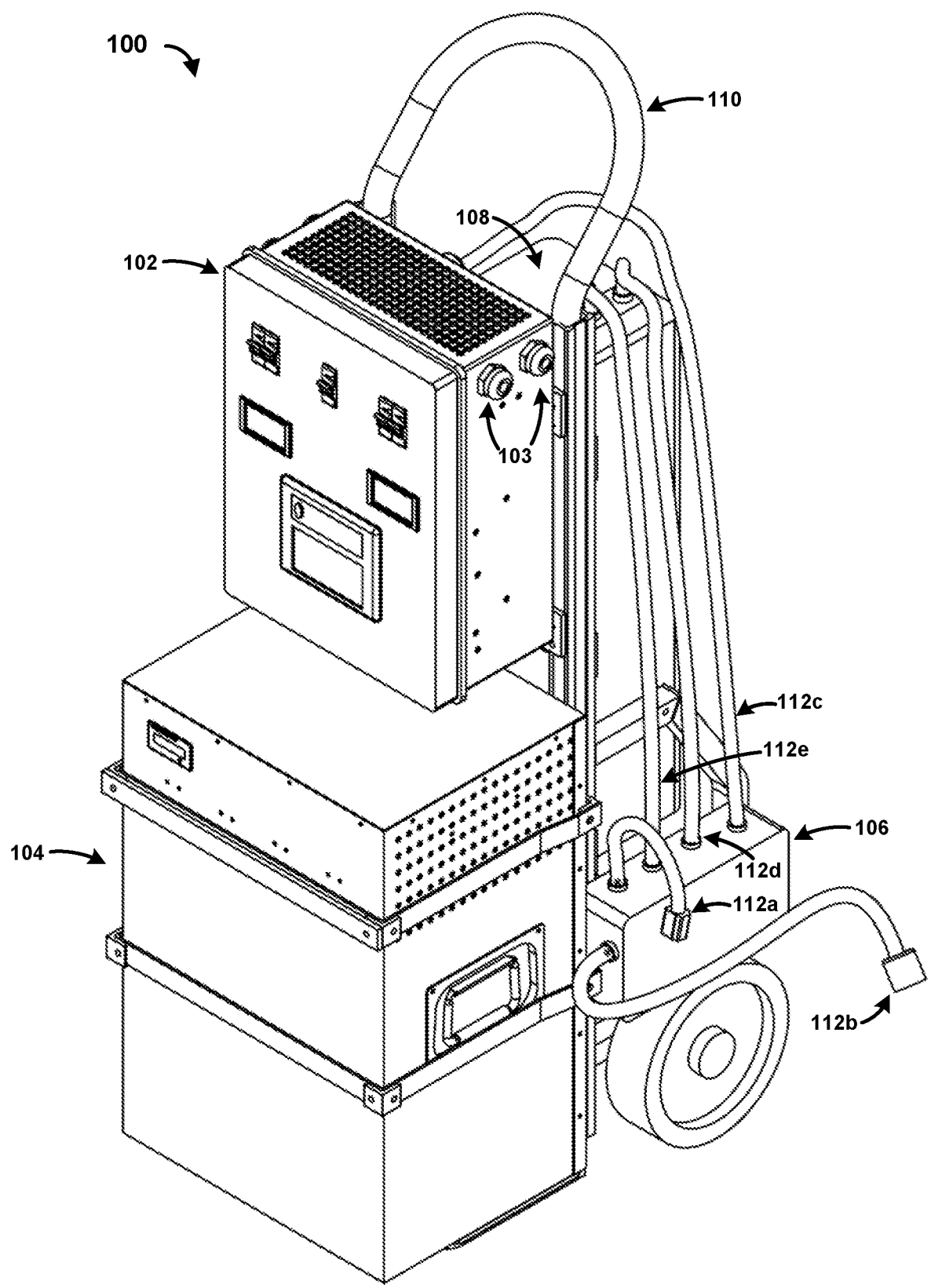
FIGS. 1A-1C illustrate an exemplary system for providing power.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes examples where said event or circumstance occurs and examples where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Described herein are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all examples of this application including, but not limited to, steps in described methods. Thus, if there are a variety of additional steps that may be performed it is understood that each of these additional steps may be performed with any specific example or combination of examples of the described methods.

The present methods and systems may be understood more readily by reference to the following description of preferred examples and the examples included therein and to the Figures and their previous and following description.

The methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Described herein is a rapidly deployable portable battery powered backup power system providing targeted AC and DC control, indication and system supply power for a variety of critical systems and components. The rapidly deployable portable battery powered backup emergency power system is designed for prolonged operation with an integrated backup uninterruptable generator power system. The rapidly deployable portable battery powered backup emergency power system may be configured for prolonged operation such as for up to 30, 60, 90 days of operation and the like.

Figure 1B:
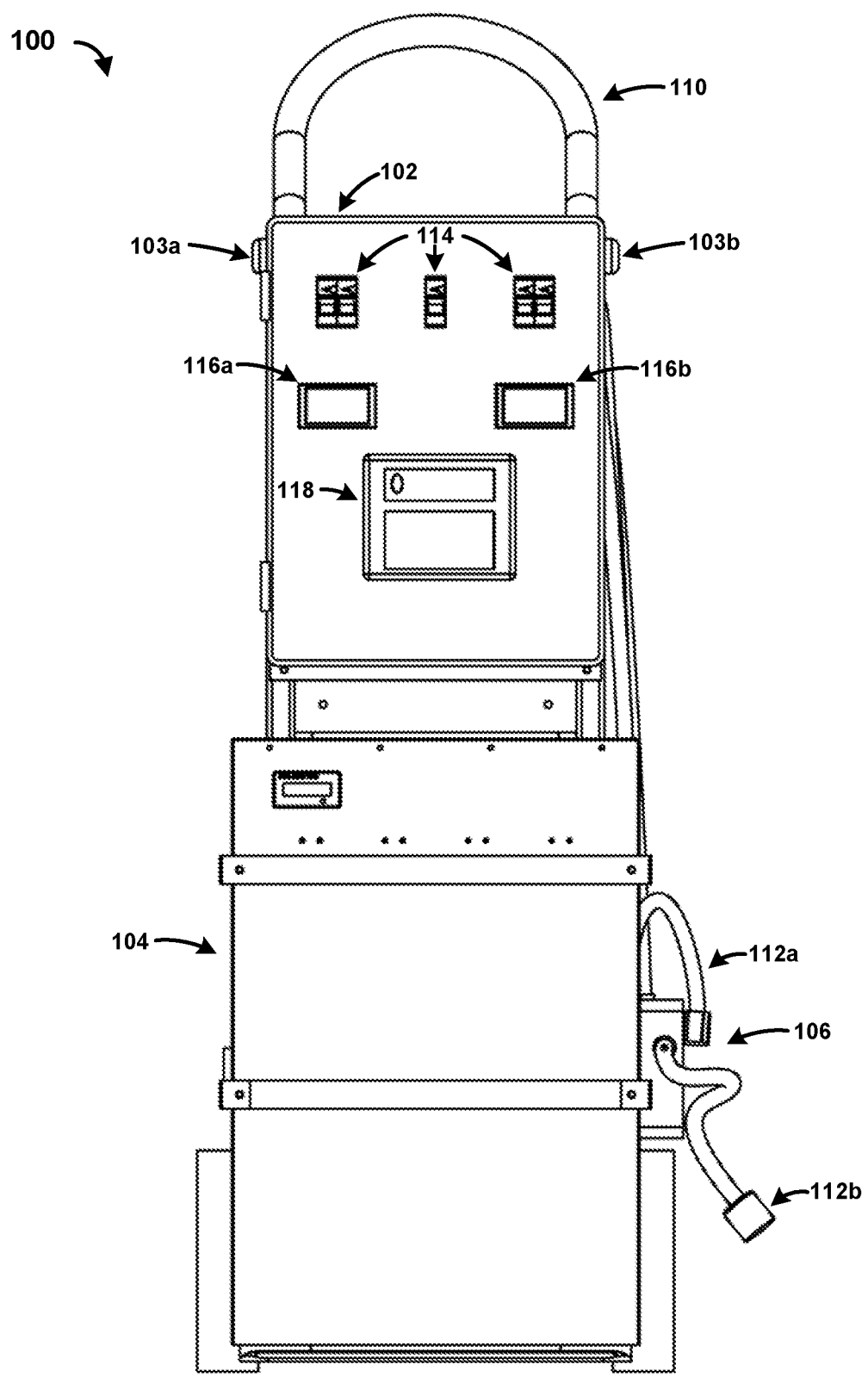
Figure 1C:
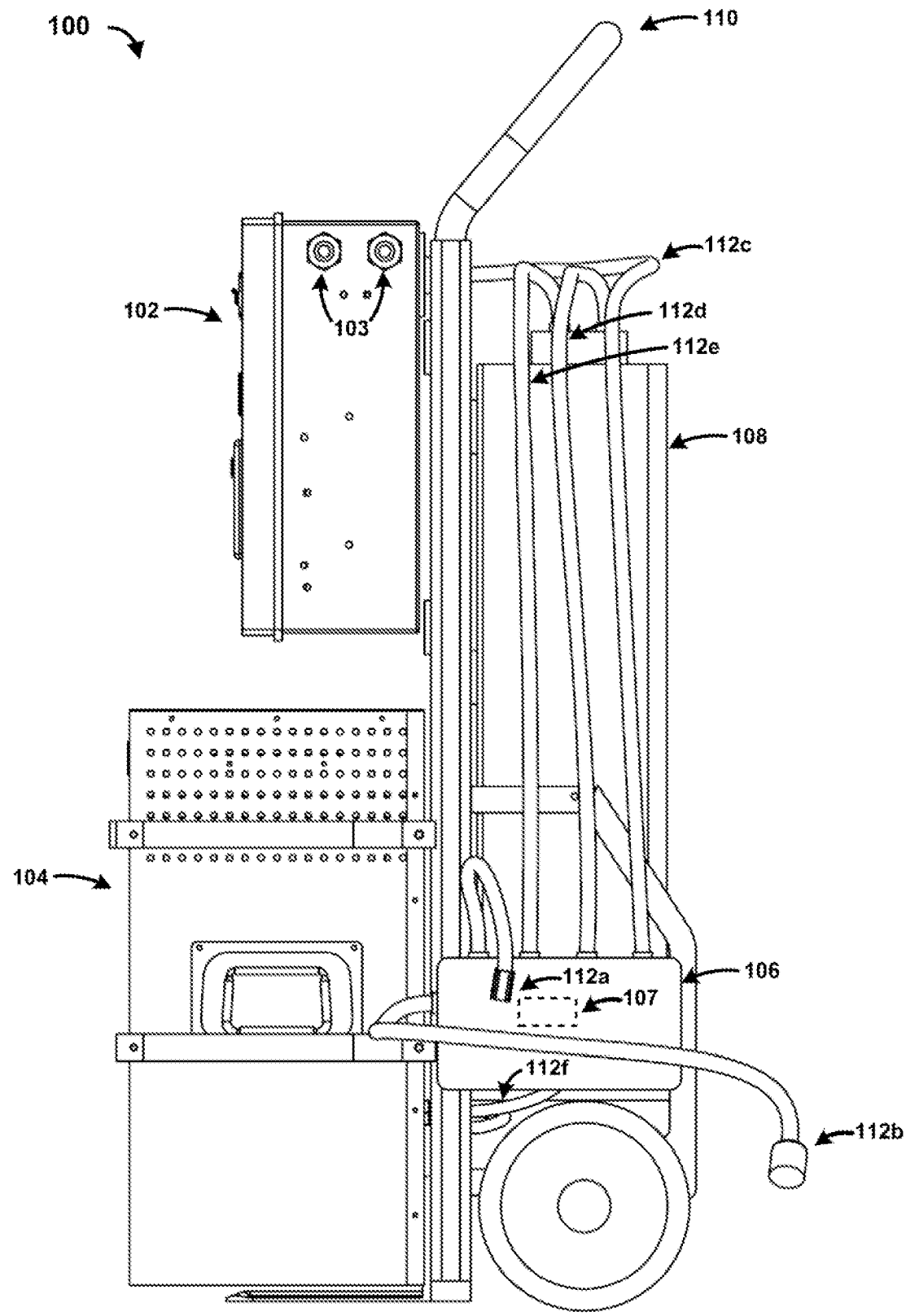

FIGS. 1A-1C illustrate an exemplary system 100 for providing power. As shown in FIG. 1A, the system 100 has a control module 102, a battery 104, a transfer switch 106, and an inverter 108. In an exemplary embodiment, the system 100 is coupled with a cart 110 such that the system 100 is a portable system.

The control module 102 can have an input/output interface (I/O), an interface, one or more outputs 103, an auxiliary port, switches, and so forth. The I/O can allow the control module 102 to communicate with one or more devices. The I/O can include any type of suitable hardware for communication with devices. For example, the I/O can include direct connection interfaces such as Ethernet and Universal Serial Bus (USB), as well as wireless communications, including but not limited to, Wi-Fi, Bluetooth, cellular, Radio Frequency (RF), and so forth. The control module 102 can provide power to the output 103 of the control module 102. For example, the control module 102 can receive power from at least one of the transfer switch 106 and/or the inverter 108, and the control module 102 can provide the received power on the output 103 to power one or more devices. As an example, one or more cables can be connected to the output 103 to couple the control module 102 to the one or more devices, and the control module 102 can provide the one or more devices power via the one or more cables connected to the output 103. The control module 102 can be removable from the cart 110 and still remain functional. For example, the control module 102 can be relocated a distance away from the cart 110, and the control module 102 can be coupled to the system 100 via one or more cables (e.g., the electrical connection 112c) coupled to the control module 102.

The battery 104 can be one or more batteries configured to store power, as well as provide the stored power. The battery 104 can provide DC power. The battery 104 can have an associated voltage, such as a 12 V, 24 V, 48 V, 125 V, 250 V, 400 V, etc. battery. Further, the battery 104 can have an output current. For example, the battery 104 can output 5 A, 50 A, 150 A, 300 A, etc. In an exemplary embodiment, the battery 104 can be a 12 V battery with a rated output of up to 150 A. In another exemplary embodiment, the battery 104 can be a 24 V battery with a rated output of up to 300 A. As will be appreciated by one skilled in the art, the battery 104 can be a battery with any voltage and/or current characteristics.

The battery 104 can be any battery, such as rechargeable batteries or non-rechargeable batteries. The battery 104 can be a Lithium Ion (Li+) battery, a lead acid (Pb) battery, a Lithium Iron Phosphate (LiFePo) battery, or any type of rechargeable battery. The battery 104 comprises an auxiliary output. The auxiliary output can be capable of receiving and/or providing DC power to another device. For example, an apparatus capable of running on DC power can be coupled to the battery 104 to receive power from the battery 104. As an example, a light can be coupled to the battery 104. As another example, an apparatus capable of providing DC power can be coupled to the 104. As an example, a maintenance battery charger can be coupled to the battery 104 to charge the battery 104.

The battery 104 can be one or more batteries configured to store power from the inverter 108. For example, the battery 104 can receive power from the inverter 108 via an electrical connection and store the power from the inverter 108. Stated differently, the inverter 108 can charge the battery 104 via the electrical connection. Additionally, the battery 104 can provide power to the inverter 108. For example, the battery 104 can discharge (e.g., provide power) to the inverter 108 via the electrical connection. Accordingly, the battery 104 is capable of receiving power from the inverter 108, as well as providing power to the inverter 108.

The transfer switch 106 can comprise any switch capable of switching between two or more power sources. For example, the transfer switch 106 can receive power from a generator (not shown) that is coupled with the transfer switch 106 via one or more electrical connections 112a,b. The transfer switch 106 can provide the received power to the inverter 108 via an electrical connection. Alternatively, the transfer switch 106 can provide the received power to the control module 102 via an electrical connection. The transfer switch 106 can comprise an adjustable voltage proving time delay module. The adjustable voltage proving time delay module can be configured to variably set at least one of a voltage delay trigger or a time delay trigger when an AC presence is detected on the electrical connection. That is, the adjustable voltage proving time delay module can be configured to set a voltage delay trigger upon receiving power from the generator. The transfer switch 106 can provide power to the control module 102 after triggering the adjustable voltage proving time delay module. That is, once the transfer switch 106 detects power from the generator via the electrical connection, the transfer switch 106 can provide power to the control module 102 via a different electrical connection.

The transfer switch 106 can comprise any switch capable of switching between two or more power sources. For example, the transfer switch 106 can receive power from a generator (not shown) that is coupled with the transfer switch 106 via one or more electrical connections 112a,b. The transfer switch 106 can provide the received power to the inverter 108 via an electrical connection. Alternatively, the transfer switch 106 can provide the received power to the control module 102 via an electrical connection. The transfer switch 106 can comprise an adjustable voltage proving time delay 107. The adjustable voltage proving time delay 107 can be configured to variably set at least one of a voltage delay trigger or a time delay trigger when an AC presence is detected on the electrical connection. That is, the adjustable voltage proving time delay 107 can be configured to set a voltage delay trigger upon receiving power from the generator. The transfer switch 106 can provide power to the control module 102 after triggering the adjustable voltage proving time delay 107. That is, once the transfer switch 106 detects power from the generator via the electrical connection, the transfer switch 106 can provide power to the control module 102 via a different electrical connection.

Additionally, the transfer switch 106 can receive power from the inverter 108. In an exemplary embodiment, the transfer switch 106 can switch receiving power between the generator and the inverter 108. Stated differently, the transfer switch 106 can auctioneer between the generator and the inverter 108. That is, the transfer switch 106 can automatically switch between the generator and the inverter 108. For example, if the generator runs out of fuel, the transfer switch 106 can switch to receiving power from the inverter 108, which is receiving power from the battery 104. In this manner, the transfer switch 106 can continue to output power to the control module 102 even if one of the power sources of the transfer switch 106 (e.g., the generator, the battery 104) stops providing power to the transfer switch 106.

The inverter 108 can be any device capable of converting AC power to DC power, as well as DC power to AC power. The inverter 108 can receive power from a generator via an electrical connection or can receive power from the transfer switch 106. For example, the inverter 108 can receive AC power directly from the generator or from the transfer switch 106. The inverter 108 can provide the received AC power to the control module 102 via an electrical connection. The inverter 108 can convert the received AC power to DC power. The inverter 108 can provide (e.g., output) the DC power to the battery 104 via an electrical connection. As an example, the inverter 108 can charge the battery 104 via the electrical connection. The inverter 108 can charge the battery 104, while also providing AC power to an output, such as the control module 102. That is, the inverter 108 is capable of charging the battery 104, while simultaneously providing power to the control module 102.

Further, the inverter 108 can receive DC power from the battery 104. For example, the inverter 108 can receive 12 VDC 24 VDC, 48 VDC, 72 VDC, as well as voltages ranging from 100 VDC to 800 VDC. The inverter 108 can invert (e.g., convert) the received DC power to AC power. The inverter 108 can output the inverted AC power. For example, the inverter 108 can output 110 VAC, 120 VAC, 208 VAC three-phase, 480 VAC three-phase, or any suitable output. The inverter 108 can provide the inverted AC power to the control module 102 via an electrical connection. For example, the inverter 108 can comprise an internal transfer switch. The internal transfer switch can be capable of auctioneering AC power output to the control module 102 between two or more electrical inputs. For example, one electrical input may be a generator (not shown), and the other may be provided by the battery 104. Stated differently, the inverter 108 is capable of switching (e.g., automatically) between power inputs in order to maintain a constant output to the control module 102. The inverter 108 can have one or more indicators that indicate the status of the inverter 108. For example, the inverter 108 can have one or more lights and/or displays that indicate the status of the inverter. In an exemplary embodiment, the lights comprise Light Emitting Diodes (LEDs).

FIG. 1B illustrates a front view of the system 100. As shown, the control module 102 has outputs 103a,b, a plurality of switches 114, two displays 116a,b, and a control interface 118. The outputs 103a,b can output DC power and/or AC power. The outputs 103a,b can output the same or different type of power, as well as the same or different amount of power. For example, the output 103a can be associated with a first power output (e.g., DC power and/or AC power), and the output 103b can be associated with a second power output (e.g., DC power and/or AC power). As an example, the output 103a can output a first DC voltage, and the output 103b can output a second DC voltage. As another example, the output 103a can output a first AC voltage, and the output 103b can output a second AC voltage. As further example, the output 103a can output a DC voltage, and the output 103b can output an AC voltage.

The switches 114 can toggle the output provided by the control module 102. That is, the outputs 103a,b can be controlled by the switches 114. For example, the switches 114 can be associated with breakers that determine whether the control module 102 provides power to the outputs 103a,b. As an example, the switches 114 can be individually flipped to control the outputs 103a,b such that the output of the control module 102 can be modified based on the position of the switch 114. Further, one of the switches 114 may be a power switch that toggles the control module 102 between an off state and an on state.

The control module 102 can have two displays 116a,b. The two displays 116a,b can indicate the status of the control module 102. For example, the two displays 116a,b can indicate the output of the control module 102. As an example, the two displays 116a,b can be associated with a specific output of the control module 102, and the two displays 116a,b can indicate the voltage and current presently being supplied by the respective output.

The control module 102 can have a control interface 118. The control interface 118 can have any capability for controlling operation of the inverter 108. For example, the control interface 118 can control the power provided to the inverter 108. That is, the control interface 118 can have the capability to turn the inverter 108 ON and OFF. The control interface 118 can also indicate the status of the inverter 108. For example, the control interface 118 can indicate whether the inverter 108 is receiving power from the battery 104 or a generator (not shown). As another example, the control interface 118 can indicate whether the battery 104 is being charged by the power being provided by the generator via the transfer switch 106. The control interface 118 can dictate the operation of the inverter 108. For example, the control interface 118 can instruct the inverter 108 to draw power from the battery 104, rather than the generator. Similarly, the control interface 118 can instruct the inverter 108 to draw power from the generator, rather than the battery 104. While the control interface 118 is described as controlling operation of the inverter, a person of ordinary skill in the art would appreciate that the control interface 118 can be capable of controlling operation of the control module 102, the battery 104, and/or the transfer switch 106.

FIG. 1C illustrates a side view of the system 100. Specifically, FIG. 1C illustrates the electrical connections 112a, b, c, d, e, f between the control module 102, the battery 104, the transfer switch 106, and the inverter 108. As shown, the transfer switch 106 is coupled to the inverter 108 via two electrical connections 112e,d. Further, the control module 102 is coupled with the transfer switch 106 via a single electrical connection 112c. Similarly, the battery 104 is coupled with the transfer switch 106 via a single electrical connection 112f.

Figure 2:
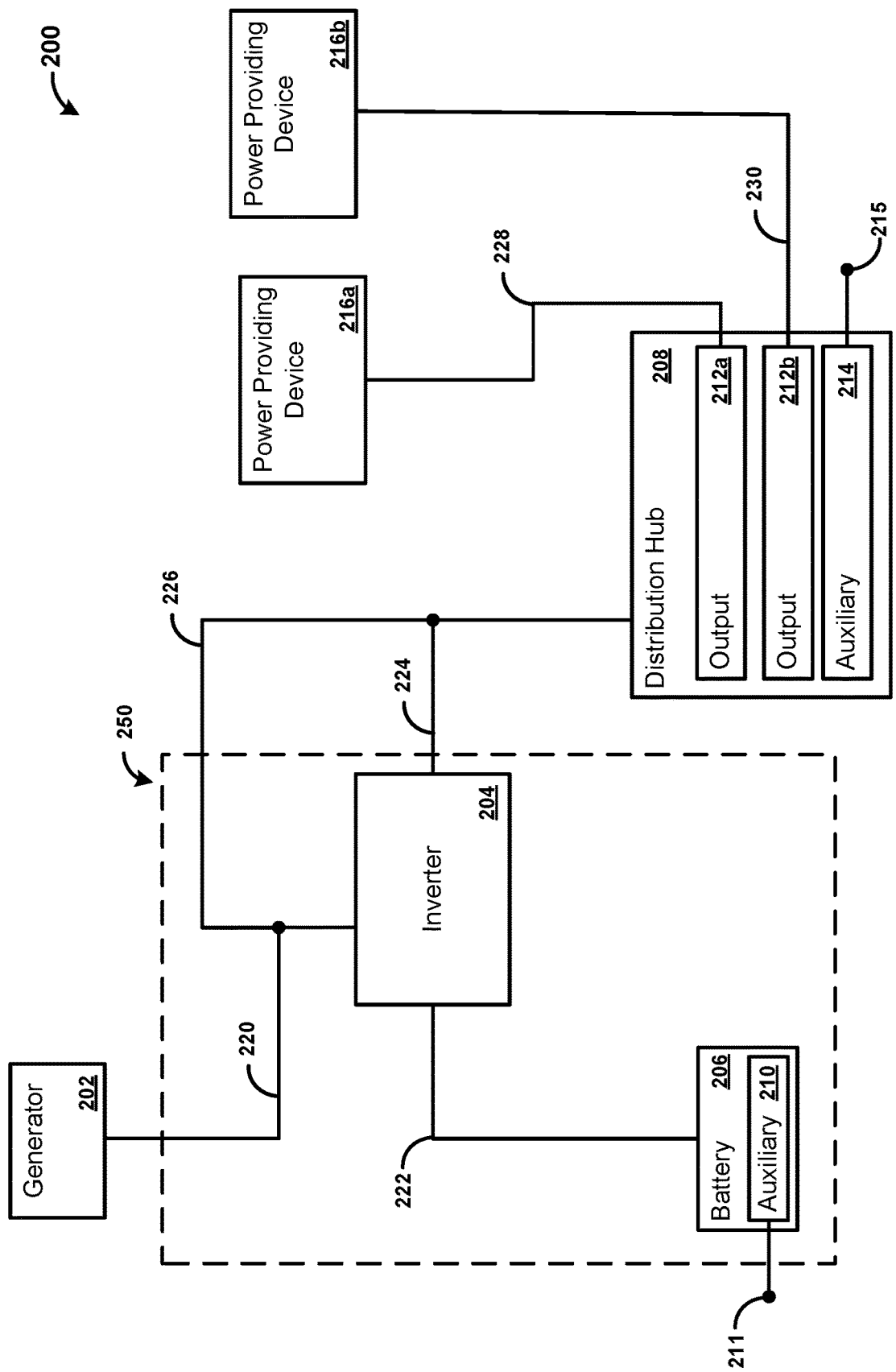
FIG. 2 illustrates an exemplary system for providing power.

FIG. 2 illustrates an exemplary system 200 for providing power. As shown, the system 200 has a generator 202, an inverter 204, a battery 206, and a distribution hub 208. Further, the system 200 comprises an apparatus 250. The apparatus 250 can comprise the inverter 204 and the battery 206. Additionally, the apparatus 250 can comprise any of the components of the system 200. For example, the apparatus 250 comprises the cart 110 of FIGS. 1A-1C. In an exemplary embodiment, each of the components of the system 200 are separate devices that are not contained within an apparatus.

The generator 202 can be any generator capable of providing power. For example, the generator 202 can be capable of Alternating Current (AC). The generator 202 can output between 100 VAC and 250 VAC, as well as higher voltages. For example, the generator 202 can output 120 VAC and/or 240 VAC. The generator 202 can operate on any suitable fuel, such as gasoline, diesel, Liquid Propane Gas (LPG), natural gas, and so forth. The generator 202 can operate on two or more fuels. For example, the generator 202 can be capable of operating on both gasoline and LPG. The generator 202 can be capable of switching between the two fuels either manually or automatically. As an example, the generator 202 can default to running on gasoline stored within a gas tank associated with the generator 202. Once the generator 202 runs out of gasoline within the gas tank, the generator 202 can switch over to the LPG. As another example, the generator 202 can switch between two or more LPG tanks coupled with the generator 202. That is, when a first of the two or more LPG tanks runs out of the LPG, the generator 202 can manually, or automatically, switch to a second of the two or more LPG tanks. The generator 202 can provide (e.g., output) power to the inverter 204 via an electrical connection 220. For example, the generator 202 can provide AC power to the inverter 204 via the electrical connection 220. Further, the generator 202 can provide power to the distribution hub 208 via the electrical connection 220 and an electrical connection 226. Stated differently, the generator 202 can bypass the inverter 204 and provide power directly to the distribution hub 208.

The inverter 204 can be any device capable of converting AC power to DC power, as well as DC power to AC power. For example, the inverter 204 can be a rectifier. The inverter 204 can receive power from the generator 202 via the electrical connection 222. For example, the inverter 204 can receive AC power from the generator 202 via the electrical connection 222. The inverter 204 can provide the received AC power to the distribution hub 208 via an electrical connection 226. The inverter 204 can convert the received AC power to DC power. The inverter 204 can provide (e.g., output) the DC power to the battery 206 via an electrical connection 224. As an example, the inverter 204 can charge the battery 206 via the electrical connection 224. The inverter 204 can charge the battery 206, while also providing AC power to the distribution hub 208. That is, the inverter 204 is capable of charging the battery 206, while simultaneously providing power to the distribution hub 208.

Further, the inverter 204 can receive DC power from the battery 206. For example, the inverter 204 can receive 12 VDC 24 VDC, 48 VDC, 72 VDC, as well as voltages ranging from 100 VDC to 800 VDC. The inverter 204 can invert (e.g., convert) the received DC power to AC power. The inverter 204 can output the inverted AC power. For example, the inverter 204 can output 110 VAC, 120 VAC, 208 VAC three-phase, 480 VAC three-phase, or any suitable output. The inverter 204 can provide the inverted AC power to the distribution hub 208 via an electrical connection 224. For example, the inverter 204 can comprise an internal transfer switch. The internal transfer switch can be capable of auctioneering AC power output to the distribution hub 208 between the electrical connection 220 (e.g., that is provided by the generator 202) and the electrical connection 222 (e.g., that is provided by the battery 206). Stated differently, the inverter 204 is capable of switching (e.g., automatically) between power inputs received from the generator 202, via the electrical connection 220, and from the battery 206, via the electrical connection 222, in order to maintain a constant output to the distribution hub 208, via the electrical connection 224. The inverter 204 can have one or more indicators that indicate the status of the inverter 204. For example, the inverter 204 can have one or more lights and/or displays that indicate the status of the inverter. In an exemplary embodiment, the lights comprise Light Emitting Diodes (LEDs).

The battery 206 can be one or more batteries configured to store power, as well as provide the stored power. The battery 206 can provide DC power. The battery 206 can have an associated voltage, such as a 12 V, 24 V, 48 V, 125 V, 250 V, 400 V, etc. battery. Further, the battery 206 can have an output current. For example, the battery 206 can output 5 A, 50 A, 150 A, 300 A, etc. In an exemplary embodiment, the battery 206 can be a 12 V battery with a rated output of up to 150 A. In another exemplary embodiment, the battery 206 can be a 24 V battery with a rated output of up to 300 A. As will be appreciated by one skilled in the art, the battery 206 can be a battery with any voltage and/or current characteristics.

The battery 206 can be any battery, such as rechargeable batteries or non-rechargeable batteries. The battery 206 can be a Lithium Ion (Li+) battery, a lead acid (Pb) battery, a Lithium Iron Phosphate (LiFePo) battery, or any type of rechargeable battery. The battery 206 comprises an auxiliary output 210. The auxiliary output 210 is capable of receiving and/or providing DC power to another device. For example, an apparatus capable of running on DC power can be coupled to the auxiliary output 210. As an example, a light can be coupled to the auxiliary output 210. As another example, an apparatus capable of providing DC power can be coupled to the auxiliary output 210. As an example, a maintenance battery charger can be coupled to the auxiliary output 210 to charge the battery 206.

The battery 206 can be one or more batteries configured to store power from the inverter 204. For example, the battery 206 can receive power from the inverter 204 via the electrical connection 222 and store the power from the inverter 204. Stated differently, the inverter 204 can charge the battery 206 via the electrical connection 222. Additionally, the battery 206 can provide power to the inverter 204. For example, the battery 206 can discharge (e.g., provide power) to the inverter 204 via the electrical connection 222. Accordingly, the battery 206 is capable of receiving power from the inverter 204, as well as providing power to the inverter 204. The distribution hub 208 can receive power from the generator 202 via the electrical connections 222 and 228. Additionally, the distribution hub 208 can receive power from the inverter via the electrical connection 226. The distribution hub 208 can comprises two or more outputs 212a,b and an auxiliary 214.

The distribution hub 208 can provide AC power to the outputs 212a,b. For example, the distribution hub 208 can provide between 100-250 VAC power to the outputs 212a,b. The outputs 212a,b provide power to two or more power providing devices 216a,b. Specifically, the output 212a can provide power to the power providing device 216a via the electrical connection 228, and the output 212b can provide power to the power providing device 216b via the electrical connection 230. In an exemplary embodiment, the electrical connections 228, 230 comprise cables coupled with the distribution hub 208 and the power providing devices 216a, b. The power providing devices 216a,b can provide a variety of different power outputs. For example, the power providing devices 216a,b can provide AC power and DC power. As an example, the power providing device 216a,b can provide AC power and DC power simultaneously. The power output provided by the power providing devices 216a,b can be between 0-260 VDC, such as 24 VDC, 48 VDC, 125 VDC, as well as 0-250 VAC, such as, 120 VAC, 240 VAC, or any suitable DC and/or AC output. The power providing devices 216a,b can have more than one output port associated with each of the power providing devices 216a,b such that the power providing devices 216a,b can provide power to a plurality of devices simultaneously.

The distribution 208 can have an auxiliary 214. The auxiliary 214 can provide power to one or more additional devices via an output connection 215. For example, the auxiliary 214 can couple the distribution hub 208 to another distribution hub. Stated differently, the auxiliary 214 provides the distribution hub 208 the capability to power one or more additional distribution hubs in order to provide additional power providing devices 216a,b. That is, the auxiliary 214 can have the capability to act as a pass through that matches the voltage of the AC input provided to the distribution hub 208. The auxiliary 214 can provide 120 VAC, 240 VAC, and/or any AC power output. The auxiliary 214 can be an auxiliary output for providing power to an auxiliary device, such as a light, a power tool, or any electrical device. As another example, the auxiliary 214 can be an interface (e.g., a display, a light, etc.) that provides information associated with the distribution hub 208. As a further example, the auxiliary 214 can be an Input/Output (I/O) interface for communicating with one or more additional electronic devices.

While the electrical connections 220-230 are shown as direct connections between the various components of the system 200 for ease of explanation, a person skilled in the art would appreciate that the electrical connections 220-230 can comprise additional components, such as resistors, capacitors, inductors, breakers, switches, and so forth.

Figure 3:
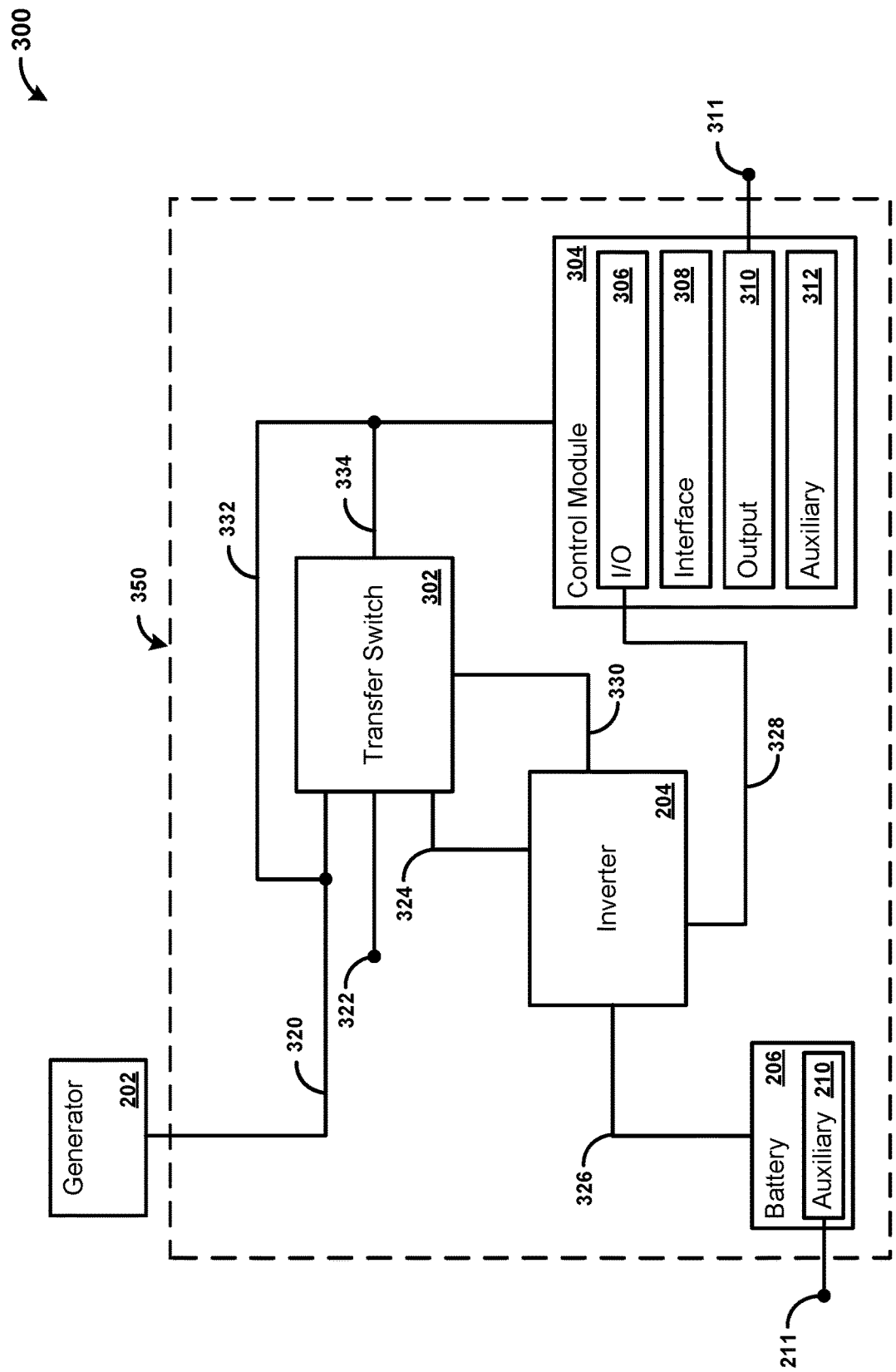
FIG. 3 illustrates an exemplary system for providing power.

FIG. 3 illustrates an exemplary system 300 for providing power. Specifically, the system 300 has the generator 202, a transfer switch 302, an inverter 204, a battery 206, and a control module 304. Further, the system 300 has an apparatus 350 that can comprise the functionality of the transfer switch 302, the inverter 204, the battery 206, and the control module 304. The apparatus 350 (e.g., the cart 110 of FIGS. 1A-1C) can comprise a wheeled container configured to mount the one or more of the transfer switch 302, the inverter 204, the battery 206, and the control module 304.

The generator 202 provides power to the transfer switch 302 via the electrical connection 320. The generator 220 also provides power to the control module 304 via the electrical connection 320 and an electrical connection 332. While the control module 304 is illustrated as being within the apparatus 350, the control module 304 is capable of being removed from the apparatus and still function appropriately. For example, the control module 304 can receive power from one or more cables that are connected to the transfer switch 302, the generator 202, and/or the inverter 204. Thus, the control module 304 can be located outside of the apparatus 350 and still function as described herein.

The transfer switch 302 can comprise any switch capable of switching between two or more power sources. As shown, the transfer switch 302 can receive power from the generator 202. The transfer switch 302 can provide the received power to the inverter 204 via an electrical connection 324. Alternatively, the transfer switch 302 can provide the received power to the control module 304 via an electrical connection 334. The transfer switch 302 can comprise an adjustable voltage proving time delay module. The adjustable voltage proving time delay module can be configured to variably set at least one of a voltage delay trigger or a time delay trigger when an AC presence is detected on the electrical connection 320. That is, the adjustable voltage proving time delay module can be configured to set a voltage delay trigger upon receiving power from the generator 202. The transfer switch 302 can provide power to the control module 304 after triggering the adjustable voltage proving time delay module. That is, once the transfer switch 302 detects power from the generator 202 via the electrical connection 320, the transfer switch 302 can provide power to the control module 304 via the electrical connection 334.

The transfer switch 302 can comprise any switch capable of switching between two or more power sources. As shown, the transfer switch 302 can receive power from the generator 202. The transfer switch 302 can provide the received power to the inverter 204 via an electrical connection 324. Alternatively, the transfer switch 302 can provide the received power to the control module 304 via an electrical connection 334. The transfer switch 302 can comprise an adjustable voltage proving time delay 107. The adjustable voltage proving time delay 107 can be configured to variably set at least one of a voltage delay trigger or a time delay trigger when an AC presence is detected on the electrical connection 320. That is, the adjustable voltage proving time delay 107 can be configured to set a voltage delay trigger upon receiving power from the generator 202. The transfer switch 302 can provide power to the control module 304 after triggering the adjustable voltage proving time delay module. That is, once the transfer switch 302 detects power from the generator 202 via the electrical connection 320, the transfer switch 302 can provide power to the control module 304 via the electrical connection 334.

Additionally, the transfer switch 302 can receive power from the inverter 204 via the electrical connection 330. In an exemplary embodiment, the transfer switch 302 can switch receiving power between the generator 202 and the inverter 204. Stated differently, the transfer switch 302 can auctioneer between the generator 202 and the inverter 204. That is, the transfer switch 302 can automatically switch between the generator 202 and the inverter 204. For example, if the generator 202 runs out of fuel, the transfer switch 302 can switch to receiving power from the inverter 204. In this manner, the transfer switch 302 can continue to output power to the control module 304 via the electrical connection 334 even if one of the power sources of the transfer switch 302 (e.g., the generator 202, the battery 206) stops providing power to the transfer switch 302.

The inverter 204 can provide power to the battery 206, as well as receive power from the battery 206 via the electrical connection 326. The inverter 204 can provide the power received from the battery 206 to the transfer witch 302 via the electrical connection 330. Additionally, the inverter 204 can be coupled with the I/O 306 of the control module 304 via an electrical connection 328. The inverter 204 can be controlled via the electrical connection 328. For example, the inverter 204 can be toggled on/off. Further, the inverter 204 can provide data via the connection 328. As an example, the inverter 204 can provide alarms and/or operating status indications to the control module 304. The control module 304 can modify the operation of the inverter 204 based on the alarms and/or the operating status indications.

The control module 304 can have an input/output interface (I/O) 306, an interface 308, an output 310, and the auxiliary port 312. The control module 304 can provide power to, or receive power from, the auxiliary port 312. The I/O 306 can allow the control module 304 to communicate with one or more devices. The I/O 306 can include any type of suitable hardware for communication with devices. For example, the I/O 306 can include direct connection interfaces such as Ethernet and Universal Serial Bus (USB), as well as wireless communications, including but not limited to, Wi-Fi, Bluetooth, cellular, Radio Frequency (RF), and so forth.

The interface 308 can comprise any interface capable of displaying information. For example, the interface 308 can be a digital display that indicates the power usage of the control module 304. As an example, the interface 308 can indicate the current and voltage being output by the control module 304 via the output 310. The output 310 can provide either AC or DC power to one or more devices via an output connection 311. For example, the output 310 can provide be 0-24 VDC, 48 VDC, 125 VDC, 120 VAC, 240 VAC, and so forth power to the one or more devices.

While the electrical connections 320-334 are shown as direct connections between the various components of the system 300 for ease of explanation, a person skilled in the art would appreciate that the electrical connections 320-334 can comprise additional components, such as resistors, capacitors, inductors, breakers, switches, and so forth.

Figure 4:
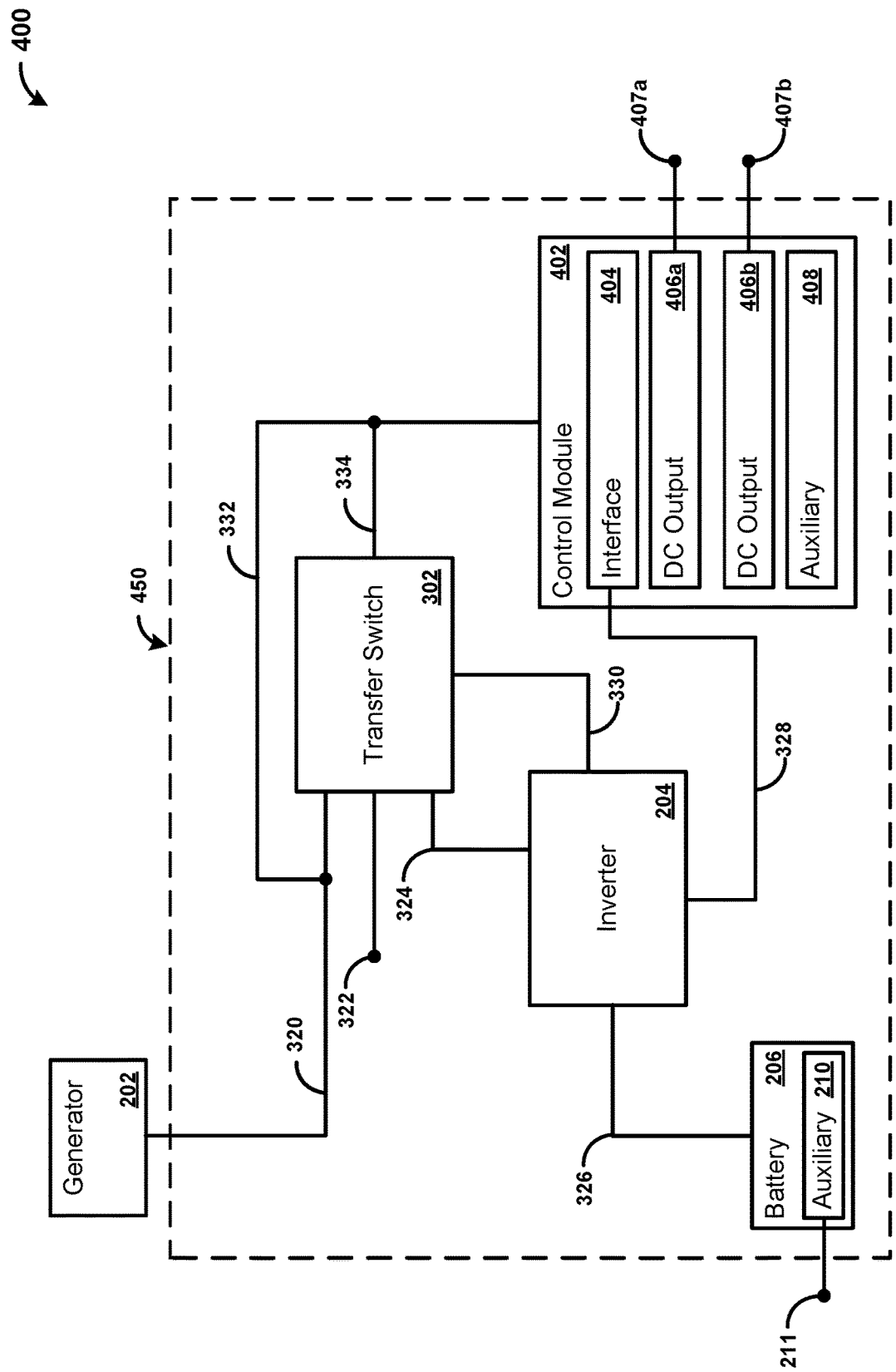
FIG. 4 illustrates an exemplary system for providing power.

FIG. 4 illustrates an exemplary system 400 for providing power. The system 400 is the same as system 300 of FIG. 3, except that the control module 304 of the apparatus 350 has been replaced with control module 402 of the apparatus 450. For example, the apparatus 450 comprises the cart 110 of FIGS. 1A-1C. The control module 402 can have an interface 404, DC outputs 406a,b, and an auxiliary port 408.

The inverter 204 can be coupled with the interface 404 of the control module 402 via an electrical connection 328. The inverter 204 can be controlled via the electrical connection 328. For example, the inverter 204 can be toggled on/off. Further, the inverter 204 can provide data via the connection 328. As an example, the inverter 204 can provide alarms and/or operating status indications to the control module 402. The control module 402 can modify the operation of the inverter 204 based on the alarms and/or the operating status indications.

The interface 404 can comprise any interface capable of displaying information. For example, the interface 404 can be a digital display that indicates the power usage of the control module 402. As an example, the interface 404 can indicate the current and voltage being output by the control module 402 via the DC outputs 406a,b. The DC outputs 406a,b can provide any amount of DC power to one or more devices via output connections 407a,b. For example, the DC outputs 406a,b can provide be 0-24 VDC, 48 VDC, 125 VDC, 240 VDC, 400 VDC, and so forth. The DC outputs 406a,b can provide the same or different power outputs. For example, one of the DC outputs 406a,b outputs a DC voltage between 115-130 VDC, while the other outputs 240-260 VDC. The DC outputs 406a,b can provide power to a variety of DC powered devices, such as DC motors, DC motor operated valves, DC solenoids, DC control power logic circuits, and so forth.

The control module 402 can provide power to, or receive power from, the auxiliary port 408. The auxiliary port 408 can provide power to one or more additional devices. For example, the auxiliary port 408 can couple the control module 402 to another device (e.g., a distribution hub, a control module, etc.). That is, the auxiliary port 408 can have the capability to act as a pass through that matches the voltage of the AC input provided to the control module 402. The auxiliary port 408 can provide 120 VAC, 240 VAC, and/or any AC power output. The auxiliary port 408 can be an auxiliary output for providing power to an auxiliary device, such as a light, a power tool, or any electrical device.

While the electrical connections 320-334 are shown as direct connections between the various components of the system 400 for ease of explanation, a person skilled in the art would appreciate that the electrical connections 320-334 can comprise additional components, such as resistors, capacitors, inductors, breakers, switches, and so forth.

Figure 5:
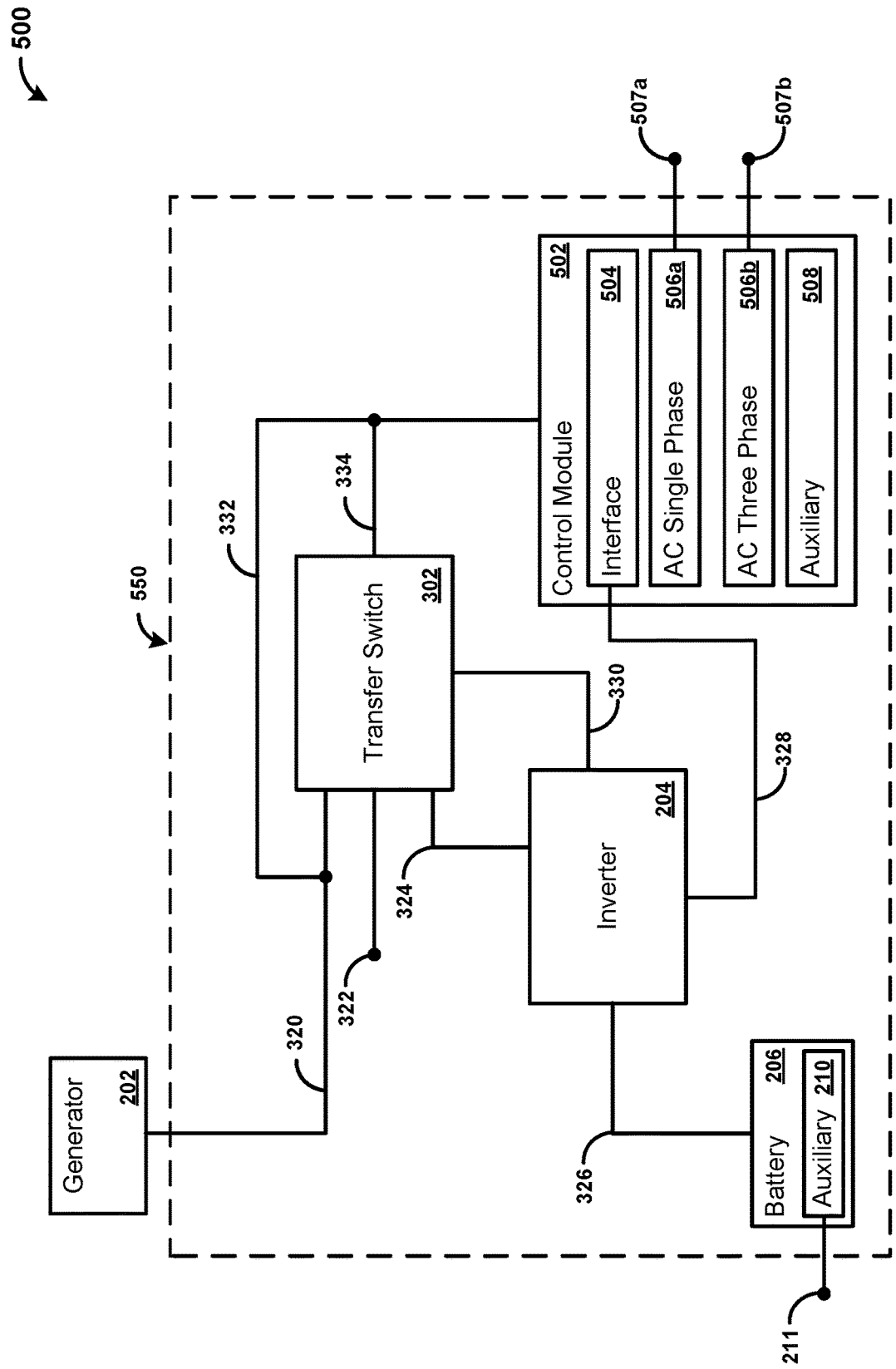
FIG. 5 illustrates an exemplary system for providing power.

FIG. 5 illustrates an exemplary system 500 for providing power. The system 500 is the same as the system 300 of FIG. 3 and the system 400 of FIG. 4, except that the control module 304 of the apparatus 350 and the control module 402 of the apparatus 450 has been replaced with the control module 502 of the apparatus 550. For example, the apparatus 550 comprises the cart 110 of FIGS. 1A-1C. The control module 502 can have an interface 504, AC outputs 506a,b, and an auxiliary port 508.

The inverter 204 can be coupled with the interface 504 of the control module 502 via an electrical connection 328. The inverter 204 can be controlled via the electrical connection 328. For example, the inverter 204 can be toggled on/off. Further, the inverter 204 can provide data via the connection 328. As an example, the inverter 204 can provide alarms and/or operating status indications to the control module 502. The control module 502 can modify the operation of the inverter 204 based on the alarms and/or the operating status indications.

The interface 504 can comprise any interface capable of displaying information. For example, the interface 504 can be a digital display that indicates the power usage of the control module 502. As an example, the interface 504 can indicate the current and voltage being output by the control module 502 via the AC outputs 506a,b. The AC outputs 406a,b can provide any amount of AC power to one or more devices via output connections 507a,b. For example, the AC output 506a can be a single phase AC output, whereas the AC output 506b can be a three-phase AC output. The AC outputs 506a,b can provide the same or different output. For example, the AC outputs 506a,b can provide be 120 VAC, 240 VAC, 400 VAC, and so forth. The AC outputs 506a,b can provide power to a variety of AC powered devices such as any AC load, AC motors, AC motor operated valves, communication equipment, and so forth.

The control module 502 can provide power to, or receive power from, the auxiliary port 508. The auxiliary port 508 can provide power to one or more additional devices. For example, the auxiliary port 508 can couple the control module 502 to another device (e.g., a distribution hub, a control module, etc.). That is, the auxiliary port 508 can have the capability to act as a pass through that matches the voltage of the AC input provided to the control module 502. The auxiliary port 508 can provide 120 VAC, 240 VAC, and/or any AC power output. The auxiliary port 508 can be an auxiliary output for providing power to an auxiliary device, such as a light, a power tool, or any electrical device.

While the electrical connections 320-334 are shown as direct connections between the various components of the system 500 for ease of explanation, a person skilled in the art would appreciate that the electrical connections 320-334 can comprise additional components, such as resistors, capacitors, inductors, breakers, switches, and so forth.

Figure 6:
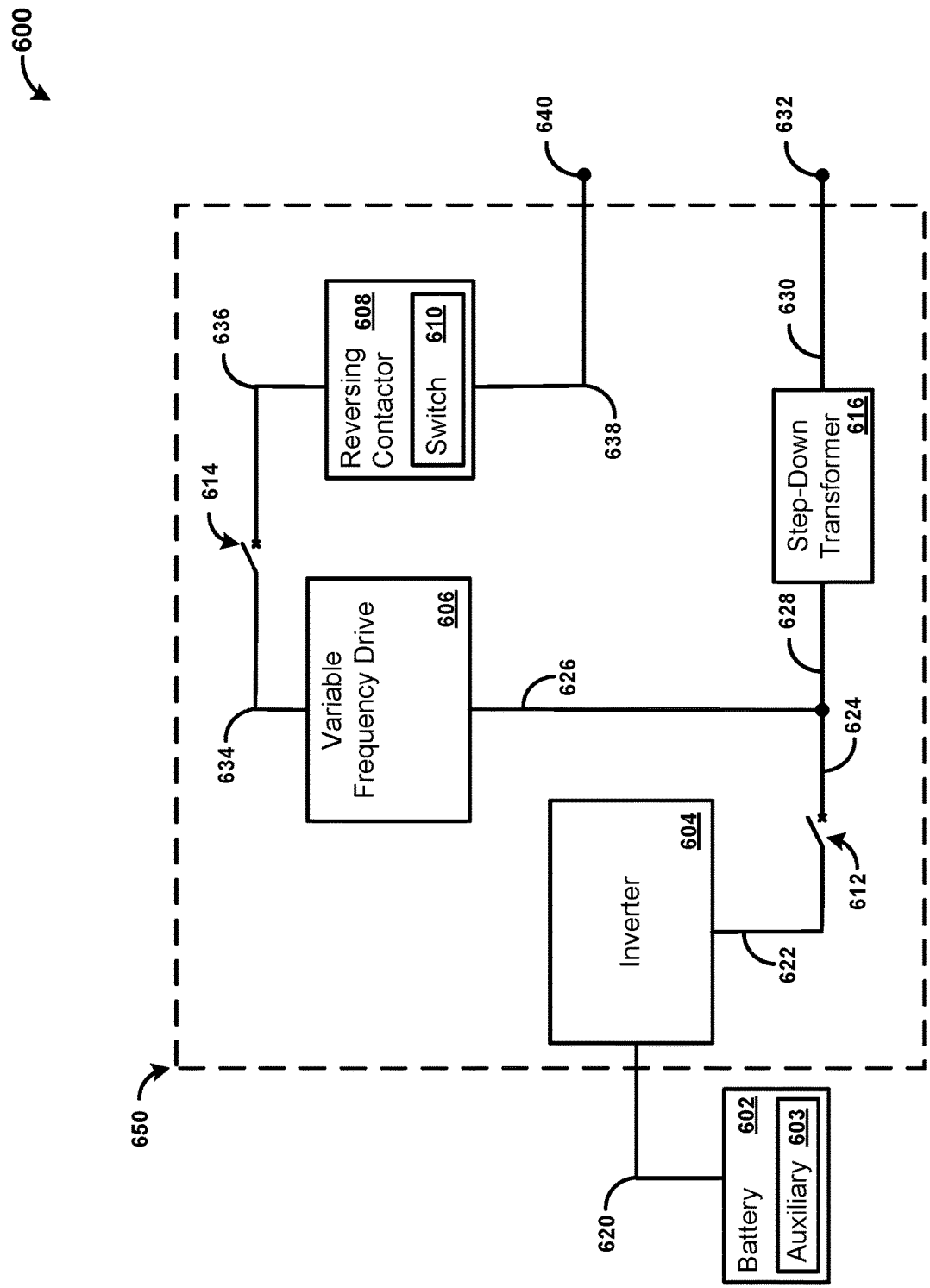
FIG. 6 illustrates an exemplary system for providing power.

FIG. 6 illustrates an exemplary system 600 for providing power. The system 600 comprises a battery 602, an inverter 604, a variable frequency drive 606, and a reversing contactor 608. In an exemplary embodiment, the system 600 comprises an apparatus 650 which comprises the inverter 604, the variable frequency drive 606, and the reversing contractor 608. Additionally, while the battery 602 is illustrated as not being a part of the apparatus 650, in an exemplary embodiment, the apparatus 650 comprises the battery 602, as well as all the capabilities of the battery 602. For example, the apparatus 600 can comprise a portable container that is capable of providing power.

The battery 602 can be one or more batteries configured to store power, as well as provide the stored power. The battery 602 can provide DC power. The battery 602 can have an associated voltage, such as a 12 V, 24 V, 48 V, 125 V, 250 V, 400 V, etc. battery. Further, the battery 602 can have an output current. For example, the battery 602 can output 5 A, 50 A, 150 A, 300 A, etc. In an exemplary embodiment, the battery 602 can be a 12 V battery with a rated output of up to 150 A. In another exemplary embodiment, the battery 602 can be a 24 V battery with a rated output of up to 300 A. As will be appreciated by one skilled in the art, the battery 602 can be a battery with any voltage and/or current characteristics.

The battery 602 can be any battery, such as rechargeable batteries or non-rechargeable batteries. The battery 602 can be a Lithium Ion (Li+) battery, a lead acid (Pb) battery, a Lithium Iron Phosphate (LiFePo) battery, or any type of rechargeable battery. The battery 602 comprises an auxiliary output 603. The auxiliary output 603 can be capable of receiving and/or providing DC power to another device. For example, an apparatus capable of running on DC power can be coupled to the battery 602 to receive power from the battery 602 via the auxiliary output 603. As an example, a light can be coupled to the battery 602. As another example, an apparatus capable of providing DC power can be coupled to the battery 602. As an example, a maintenance battery charger can be coupled to the battery 602 via the auxiliary output 603 to charge the battery 602. Additionally, the battery 602 can provide power to the inverter 604. For example, the battery 602 can discharge (e.g., provide power) to the inverter 604 via the electrical connection 628.

The inverter 604 can be any device capable of converting DC power to AC power. The inverter 604 can receive DC power from the battery 602 via the electrical connection 620. The inverter 604 can convert (e.g., invert) the received DC power to AC power. The inverter 604 can provide the converted AC power to the electrical connection 622. The inverter 604 can have one or more indicators that indicate the status of the inverter 604. For example, the inverter 604 can have one or more lights and/or displays that indicate the status of the inverter. In an exemplary embodiment, the lights comprise Light Emitting Diodes (LEDs).

The electrical connection 622 can be coupled to a breaker 612. The inverter 604 can provide power to the breaker 612 via the electrical connection 622. The breaker 612 can be coupled to an electrical connection 624. The electrical connection 624 can be coupled to an electrical connection 626 that is coupled with the variable frequency drive 606, as well coupled to an electrical connection 628 that is coupled to a step-down transformer 616. The step-down transformer 616 can reduce (e.g., step-down) the power provided by the inverter 604 to provide a lower power to one or more devices that require a different voltage than the voltage output by the inverter 604. The step-down transformer 616 is coupled to an electrical connection 630 that is coupled to an output 632. The output 632 can be a control power output. Thus, the output 632 can receive power from the inverter 604 after the inverter 604 has converted the DC power from the battery 602 to AC power, and step-down the received AC power to provide a lower power output on the output 632.

The variable frequency drive 606 receives the AC power from the inverter 604. The variable frequency drive 606 converts the AC power to three-phase AC power. That is, the variable frequency drive 606 receives single phase AC power from the inverter 604, and converts the single phase AC power to three-phase AC power. The variable frequency drive 606 can output the three-phase AC power to the electrical connection 632. The variable frequency drive 606 can provide AC power from 0-480 VAC. Further, the variable frequency drive 606 can be configured to limit inrush current when a load (e.g., an AC load) coupled to the output 640 turns on. The operation of the variable frequency drive 606 can be modified by programming. For example, a ramp rate of the variable frequency drive 606 can be modified, as well as a terminal voltage of the variable frequency drive 606.

The electrical connection 634 can be coupled with a breaker 614. The breaker 614 can be coupled to an electrical connection 636. The electrical connection 636 can be coupled to the reversing contactor 608. The reversing contactor 608 can be configured to modify (e.g., shift) the phase of the power output by the variable frequency drive 606. Specifically, the reversing contactor 608 can shift the power output to ensure the frequency of the three-phase AC power is in the proper phase. The reversing contactor 608 can be coupled with a switch 610 that indicates the phase of the three-phase AC power. A user can manipulate the switch 610 to modify the operating mode of the reversing contactor 608. For example, the switch 610 can have a forward mode and a reverse mode. Flipping the switch 610 between the two modes reverse the direction of the three-phase AC power. For example, flipping the switch 610 can shift the three-phase AC power by 120 degrees. The reversing contactor 608 can provide an output to the electrical connection 638, which is coupled to an output 640. The output 640 can be coupled to a device that operates on three-phase AC power. For example, the output 640 can provide power to a variety of AC powered devices such as any AC load, AC motors, AC motor operated valves, communication equipment, and so forth. While the reversing contactor 608 is illustrated as being separate from the variable frequency drive 606 for ease of explanation, a person of ordinary skill in the art would appreciate that the reversing contactor 608 can be incorporated into the variable frequency drive 606. Stated differently, the variable frequency drive 606 can include the capabilities of the reversing contactor 608. Thus, the variable frequency drive 606 can include the capability to modify the phase of the power output by the variable frequency drive 606.

Further, the apparatus 600 can comprise one or more indicators (not shown). For example, the one or more indicators can indicate the power output of one or more outputs (e.g., the output 632, and/or the output 640). As an example, a first indicator could indicate the AC voltage and/or AC current output by the output 632, and a second indictor could indicate the three-phase AC voltage and/or AC current output by the output 640.

While the electrical connections 620-638 are generally shown as direct connections between the various components of the system 600 for ease of explanation, a person skilled in the art would appreciate that the electrical connections 620-638 can comprise additional components, such as resistors, capacitors, inductors, breakers, switches, and so forth.

Figure 7:
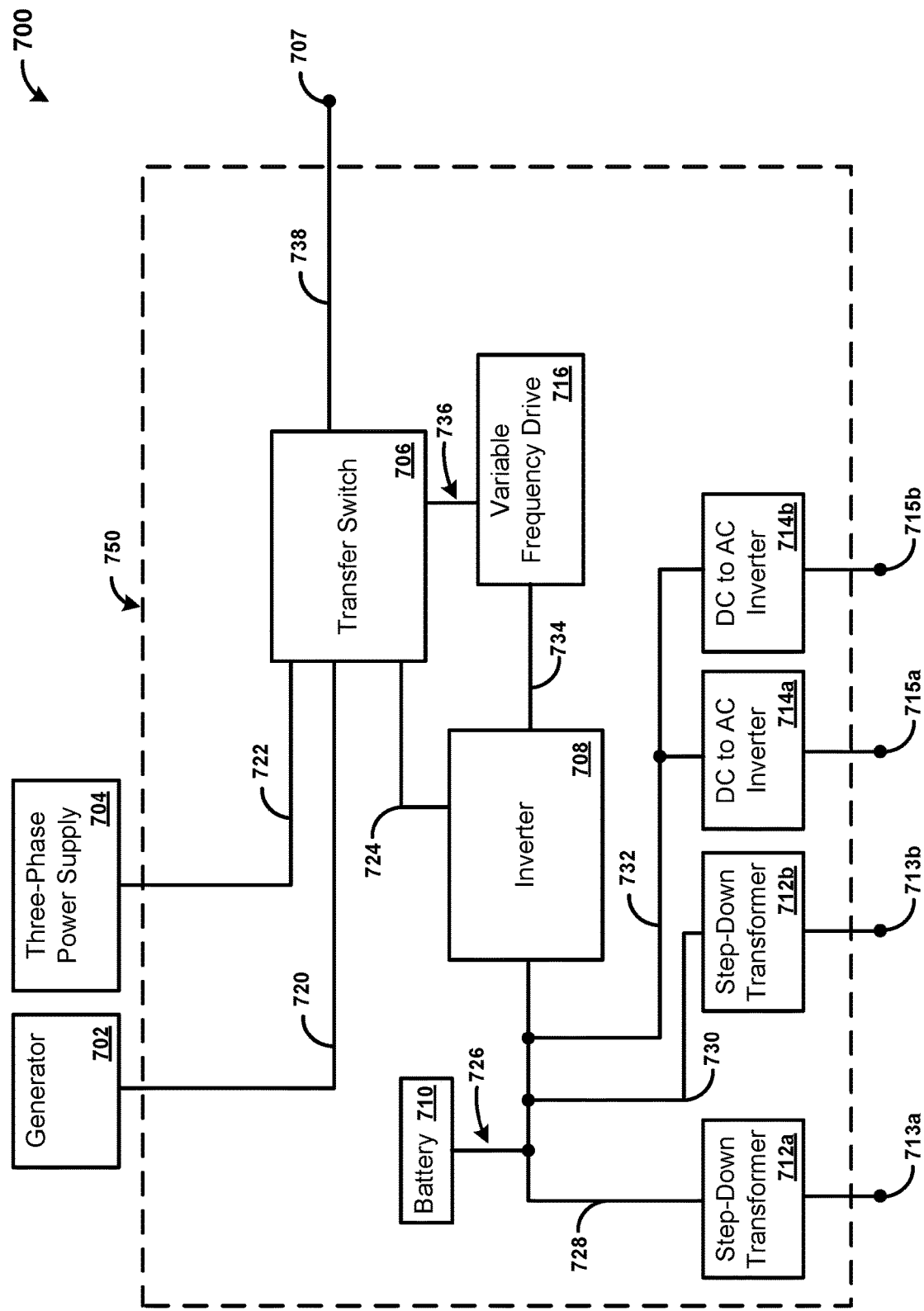
FIG. 7 illustrates an exemplary system for providing power.

FIG. 7 illustrates an exemplary system 700 for providing power. The system 700 has a generator 702, a three-phase power supply 704, a transfer switch 706, an inverter 708, a battery 710, and a variable frequency drive 716. Additionally, the system 700 comprises step-down transformers 712a,b and DC to AC inverters 714a,b. Further, the system 700 comprises an apparatus 750. The apparatus 750 can comprise the transfer switch 706, the inverter 708, the battery 710, the variable frequency drive 716, the step-down transformers 712a,b, and the DC to AC inverters 714a,b. For example, the apparatus 750 can be a single device (e.g., enclosure) that comprises the components of the system 700 except for the generator 702 and the three-phase power supply 704.

The generator 702 can be any generator capable of providing power. For example, the generator 702 can be capable of Alternating Current (AC). The generator 702 can output between 100 VAC and 250 VAC, as well as higher voltages. For example, the generator 702 can output 120 VAC and/or 240 VAC. The generator 702 can provide (e.g., output) power to the transfer switch 706 via an electrical connection 720. For example, the generator 702 can provide AC power to the transfer switch 706 via the electrical connection 720.

The generator 702 can operate on any suitable fuel, such as gasoline, diesel, Liquid Propane Gas (LPG), natural gas, and so forth. The generator 702 can operate on two or more fuels. For example, the generator 702 can be capable of operating on both gasoline and LPG. The generator 702 can be capable of switching between the two fuels either manually or automatically. As an example, the generator 702 can default to running on gasoline stored within a gas tank associated with the generator 702. Once the generator 702 runs out of gasoline within the gas tank, the generator 702 can switch over to the LPG. As another example, the generator 702 can switch between two or more LPG tanks coupled with the generator 702. That is, when a first of the two or more LPG tanks runs out of the LPG, the generator 702 can manually, or automatically, switch to a second of the two or more LPG tanks.

The three-phase power supply 704 can be any suitable three-phase power supply 704. For example, the three-phase power supply 704 can be coupled with a power distribution network that receives power from a power plant. The three-phase power supply 704 can output between 100 VAC and 250 VAC, as well as higher voltages. For example, the three-phase power supply 704 can output 120 VAC and/or 240 VAC. The three-phase power supply 704 can provide (e.g., output) power to the transfer switch 706 via an electrical connection 722. For example, the three-phase power supply 704 can provide AC power to the transfer switch 706 via the electrical connection 722.

The transfer switch 706 can comprise any switch capable of switching between two or more power sources. As shown, the transfer switch 706 can receive power from the generator 702 and/or the three-phase power supply 704. The transfer switch 706 can provide the received power to the inverter 708 via an electrical connection 724. Alternatively, the transfer switch 706 can provide the received power to an output 707 via an electrical connection 738. The transfer switch 706 can comprise an adjustable voltage proving time delay module. The adjustable voltage proving time delay module can be configured to variably set at least one of a voltage delay trigger or a time delay trigger when an AC presence is detected on the electrical connection 720. That is, the adjustable voltage proving time delay module can be configured to set a voltage delay trigger upon receiving power from the generator 702.

The transfer switch 706 can comprise any switch capable of switching between two or more power sources. As shown, the transfer switch 706 can receive power from the generator 702 and/or the three-phase power supply 704. The transfer switch 706 can provide the received power to the inverter 708 via an electrical connection 724. Alternatively, the transfer switch 706 can provide the received power to an output 707 via an electrical connection 738. The transfer switch 706 can comprise an adjustable voltage proving time delay 107. The adjustable voltage proving time delay 107 can be configured to variably set at least one of a voltage delay trigger or a time delay trigger when an AC presence is detected on the electrical connection 720. That is, the adjustable voltage proving time delay 107 can be configured to set a voltage delay trigger upon receiving power from the generator 702.

The inverter 708 can be any device capable of converting AC power to DC power, as well as DC power to AC power. For example, the inverter 708 can be a rectifier. The inverter 708 can receive power from the generator 702 and/or the three-phase power supply 704 via the electrical connection 724. For example, the inverter 708 can receive AC power from the generator 702 and/or the three-phase power supply 704 via the transfer switch 706 by receiving the power via the electrical connection 724. The inverter 708 can convert the received AC power to DC power. The inverter 708 can provide (e.g., output) the DC power to the battery 710 via an electrical connection 726. As an example, the inverter 708 can charge the battery 710 via the electrical connection 726. The inverter 708 can charge the battery 710, while also providing power to one or more additional devices. For example, the inverter 708 can provide power to the step-down transformers 712a,b and the DC to AC inverters 714a,b, while also charging the battery 710.

Further, the inverter 708 can receive DC power from the battery 710. For example, the inverter 708 can receive 12 VDC 24 VDC, 48 VDC, 72 VDC, as well as voltages ranging from 100 VDC to 800 VDC. The inverter 708 can invert (e.g., convert) the received DC power to AC power. The inverter 708 can output the inverted AC power. For example, the inverter 708 can output 110 VAC, 120 VAC, or any suitable output AC output. The inverter 708 can provide the inverted AC power to the variable frequency drive 716 via an electrical connection 734. For example, the inverter 708 can comprise an internal transfer switch. The internal transfer switch can be capable of auctioneering AC power output to the variable frequency drive 716 between the electrical connection 724 (e.g., that is provided by the transfer switch 706) and the electrical connection 726 (e.g., that is provided by the battery 710). Stated differently, the inverter 708 is capable of switching (e.g., automatically) between power inputs received from the transfer switch 706, via the electrical connection 724, and from the battery 710, via the electrical connection 726, in order to maintain a constant output to the variable frequency device 716 via the electrical connection 734. The inverter 708 can have one or more indicators that indicate the status of the inverter 708. For example, the inverter 708 can have one or more lights and/or displays that indicate the status of the inverter. In an exemplary embodiment, the lights comprise Light Emitting Diodes (LEDs).

The battery 710 can be one or more batteries configured to store power, as well as provide the stored power. The battery 710 can provide DC power. The battery 710 can have an associated voltage, such as a 12 V, 24 V, 48 V, 125 V, 250 V, 400 V, etc. battery. Further, the battery 710 can have an output current. For example, the battery 710 can output 5 A, 50 A, 150 A, 300 A, etc. In an exemplary embodiment, the battery 710 can be a 12 V battery with a rated output of up to 150 A. In another exemplary embodiment, the battery 710 can be a 24 V and/or a 48 V battery with a rated output of up to 300 A. As a further exemplary embodiment, the battery 710 can be a 410 V battery. As will be appreciated by one skilled in the art, the battery 710 can be a battery with any voltage and/or current characteristics.

The battery 710 can be any battery, such as rechargeable batteries or non-rechargeable batteries. The battery 710 can be a Lithium Ion (Li+) battery, a lead acid (Pb) battery, a Lithium Iron Phosphate (LiFePo) battery, or any type of rechargeable battery. The battery 710 can be one or more batteries configured to store power from the inverter 708. For example, the battery 710 can receive power from the inverter 708 via the electrical connection 726 and store the power from the inverter 708. Stated differently, the inverter 708 can charge the battery 710 via the electrical connection 726. Additionally, the battery 710 can provide power to the inverter 708. For example, the battery 710 can discharge (e.g., provide power) to the inverter 708 via the electrical connection 726. Accordingly, the battery 710 is capable of receiving power from the inverter 708, as well as providing power to the inverter 708.

Further, the battery 710 can have an auxiliary output (not shown). The auxiliary output can be capable of receiving and/or providing DC power to another device. For example, an apparatus capable of running on DC power can be coupled to the battery 710 to receive power from the battery 710 via the auxiliary output. As an example, a light can be coupled to the battery 710. As another example, an apparatus capable of providing DC power can be coupled to the battery 710. As an example, a maintenance battery charger can be coupled to the battery 710 via the auxiliary output to charge the battery 710.

The variable frequency drive 716 receives AC power from the inverter 708 via the electrical connection 734. The variable frequency drive 716 converts the AC power to three-phase AC power. That is, the variable frequency drive 716 receives single phase AC power from the inverter 708, and converts the single phase AC power to three-phase AC power. The variable frequency drive 716 can output the three-phase AC power to the transfer switch 706 via an electrical connection 736. The variable frequency drive 716 can provide AC power from 0-480 VAC. The operation of the variable frequency drive 716 can be modified by programming. For example, a ramp rate of the variable frequency drive 716 can be modified, as well as a terminal voltage of the variable frequency drive 716.

The step-down transformers 712a,b can reduce (e.g., step-down) the power provided by the inverter 708 and/or the battery 710 to provide a lower power to one or more devices that require a different voltage than the voltage output by the inverter 708 and/or the battery 710. That is, the step-down transformers 712a,b step-down the voltage provided by the inverter 708 and/or the battery 710 to provide a step-downed voltage to outputs 713a,b. The step-down transformer 712a can receive DC power via the electrical connection 728 and provide the stepped-down voltage to the output 713a. The step-down transformer 712b can receive DC power via the electrical connection 730 and provide the stepped-down voltage to the output 713b. The outputs 713a,b can receive power from the inverter 708 after the inverter 708 has inverted the AC power from the transfer switch 706 to DC power, and step-down the received DC power to provide a lower power output on the outputs 713a,b. Additionally, the outputs 713a,b can receive DC power from the battery 710 and step-down the received DC power to provide a lower power output on the outputs 713a,b. The outputs 713a,b can output voltages of 12 VDC 24 VDC, 48 VDC, 72 VDC, as well as voltages ranging from 100 VDC to 800 VDC. In an exemplary embodiment, one of the outputs 713a,b outputs 125 VDC, while the other output outputs 250 VDC. The step-down transformers 712a,b can have one or more indicators that indicate the status of the step-down transformers 712a,b. For example, the step-down transformers 712a,b can have one or more lights and/or displays that indicate the status of the step-down transformers 712a,b. In an exemplary embodiment, the lights comprise Light Emitting Diodes (LEDs).

The DC to AC inverters 714a,b can receive DC power from the inverter 708 and/or the battery 710. The DC to AC inverters 714a,b can receive DC power from the inverter 708 and/or the battery 710 via an electrical connection 732. For example, the DC to AC inverters 714a,b can receive 12 VDC 24 VDC, 48 VDC, 72 VDC, as well as voltages ranging from 100 VDC to 800 VDC. The DC to AC inverters 714a,b can invert (e.g., convert) the received DC power to AC power. The DC to AC inverters 714a,b can output the inverted AC power. For example, the DC to AC inverters 714a,b can output AC power between 0-800 VAC or any suitable output. In an exemplary embodiment, the DC to AC inverters 714a,b can output between 110-240 VAC. The DC to AC inverter 714a can provide the inverted AC power to a device via an output 715a, and the DC to AC inverter 714b can provide the inverted AC power to a device via an output 715b. The DC to AC inverters 714a,b can have one or more indicators that indicate the status of the DC to AC inverters 714a,b. For example, the DC to AC inverters 714a,b can have one or more lights and/or displays that indicate the status of the DC to AC inverters 714a,b. In an exemplary embodiment, the lights comprise Light Emitting Diodes (LEDs).

While the electrical connections 720-738 are generally shown as direct connections between the various components of the system 700 for ease of explanation, a person skilled in the art would appreciate that the electrical connections 720-738 can comprise additional components, such as resistors, capacitors, inductors, breakers, switches, and so forth.

Figure 8:
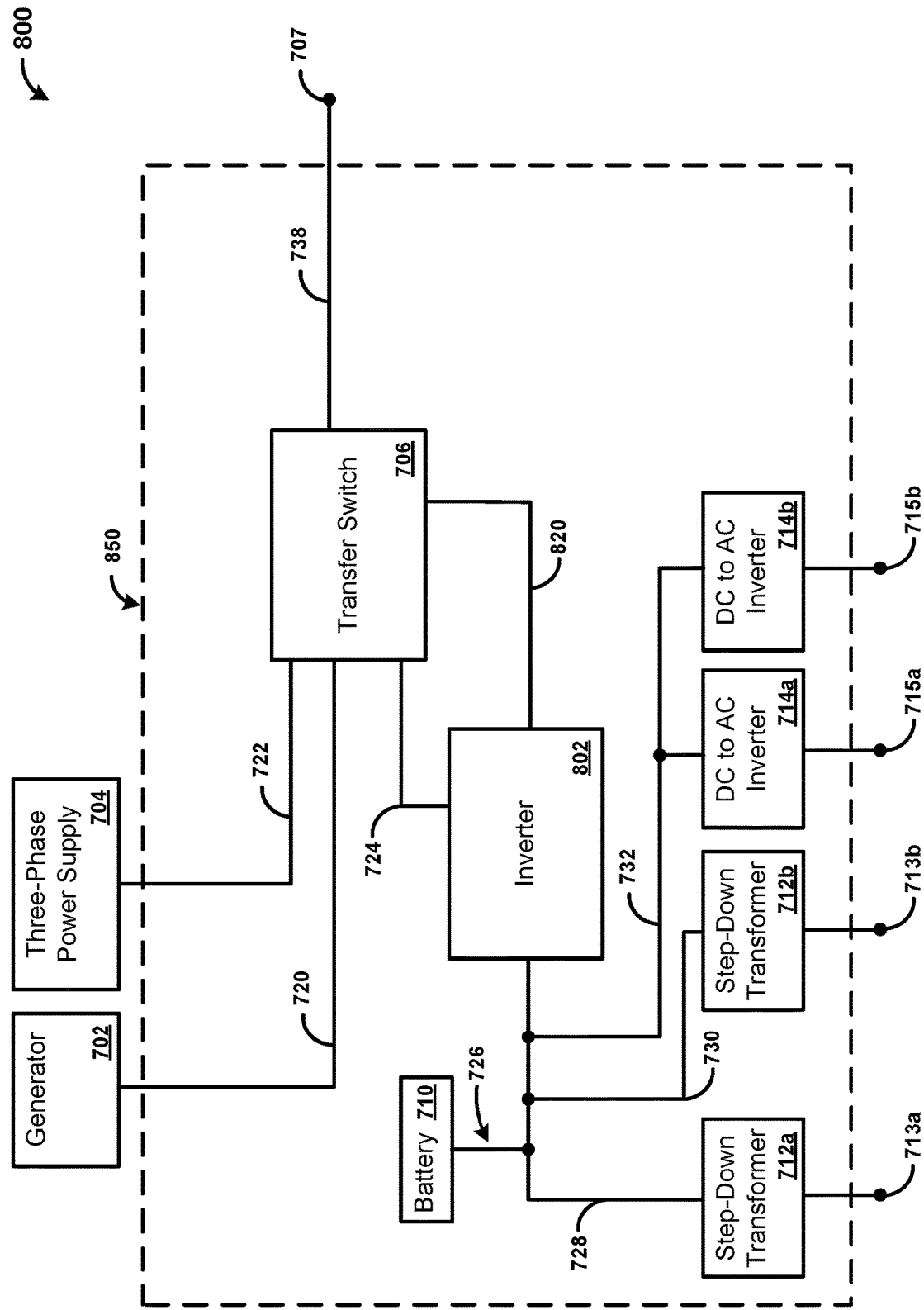
FIG. 8 illustrates an exemplary system for providing power.

FIG. 8 illustrates an exemplary system 800 for providing power. Specifically, as is explained in more detail below, the system 800 is the same as system 700 of FIG. 7 except that the inverter 802 comprises the functionality of the variable frequency drive of 716 of FIG. 7.

The inverter 802 can be any device capable of converting AC power to DC power, as well as DC power to AC power. For example, the inverter 802 can be a rectifier. The inverter 802 can receive power from the generator 702 and/or the three-phase power supply 704 via the electrical connection 724. For example, the inverter 802 can receive AC power from the generator 702 and/or the three-phase power supply 704 via the transfer switch 706 by receiving the power via the electrical connection 724. The inverter 802 can convert the received AC power to DC power. The inverter 802 can provide (e.g., output) the DC power to the battery 710 via an electrical connection 726. As an example, the inverter 802 can charge the battery 710 via the electrical connection 726.

The inverter 802 can charge the battery 710, while also providing power to one or more additional devices. For example, the inverter 802 can provide power to the step-down transformers 712a,b and the DC to AC inverters 714a,b, while also charging the battery 710.

Further, the inverter 802 can receive DC power from the battery 710. For example, the inverter 802 can receive 12 VDC 24 VDC, 48 VDC, 72 VDC, as well as voltages ranging from 100 VDC to 800 VDC. The inverter 802 can invert (e.g., convert) the received DC power to AC power. The inverter 802 can output the inverted AC power. The inverter 802 can output the inverted AC power to the transfer switch 706 via an electrical connection 820. For example, the inverter 802 can output 110 VAC, 120 VAC, or any suitable output AC output to the transfer switch 706.

The inverter 802 can comprise an internal transfer switch. The internal transfer switch can be capable of auctioneering AC power output to the transfer switch 806 between the electrical connection 724 (e.g., that is provided by the transfer switch 706) and the electrical connection 726 (e.g., that is provided by the battery 710). Stated differently, the inverter 802 is capable of switching (e.g., automatically) between power inputs received from the transfer switch 706, via the electrical connection 724, and from the battery 710, via the electrical connection 726, in order to maintain a constant output to the transfer switch 706 via the electrical connection 820. The inverter 802 can have one or more indicators that indicate the status of the inverter 802. For example, the inverter 802 can have one or more lights and/or displays that indicate the status of the inverter. In an exemplary embodiment, the lights comprise Light Emitting Diodes (LEDs).

The inverter 802 can be capable of outputting three-phase AC power. That is, the inverter 802 can convert the inverted AC power to three-phase AC power, and output the three-phase AC power to the transfer switch 706 via the electrical connection 820. The inverter 802 can provide three-phase AC power from 0-480 VAC. The operation of the inverter 802 can be modified by programming. For example, a ramp rate of the inverter 802 can be modified, as well as a terminal voltage of the inverter 802.

While the electrical connections 820-836 are generally shown as direct connections between the various components of the system 800 for ease of explanation, a person skilled in the art would appreciate that the electrical connections 820-836 can comprise additional components, such as resistors, capacitors, inductors, breakers, switches, and so forth.

Figure 9:
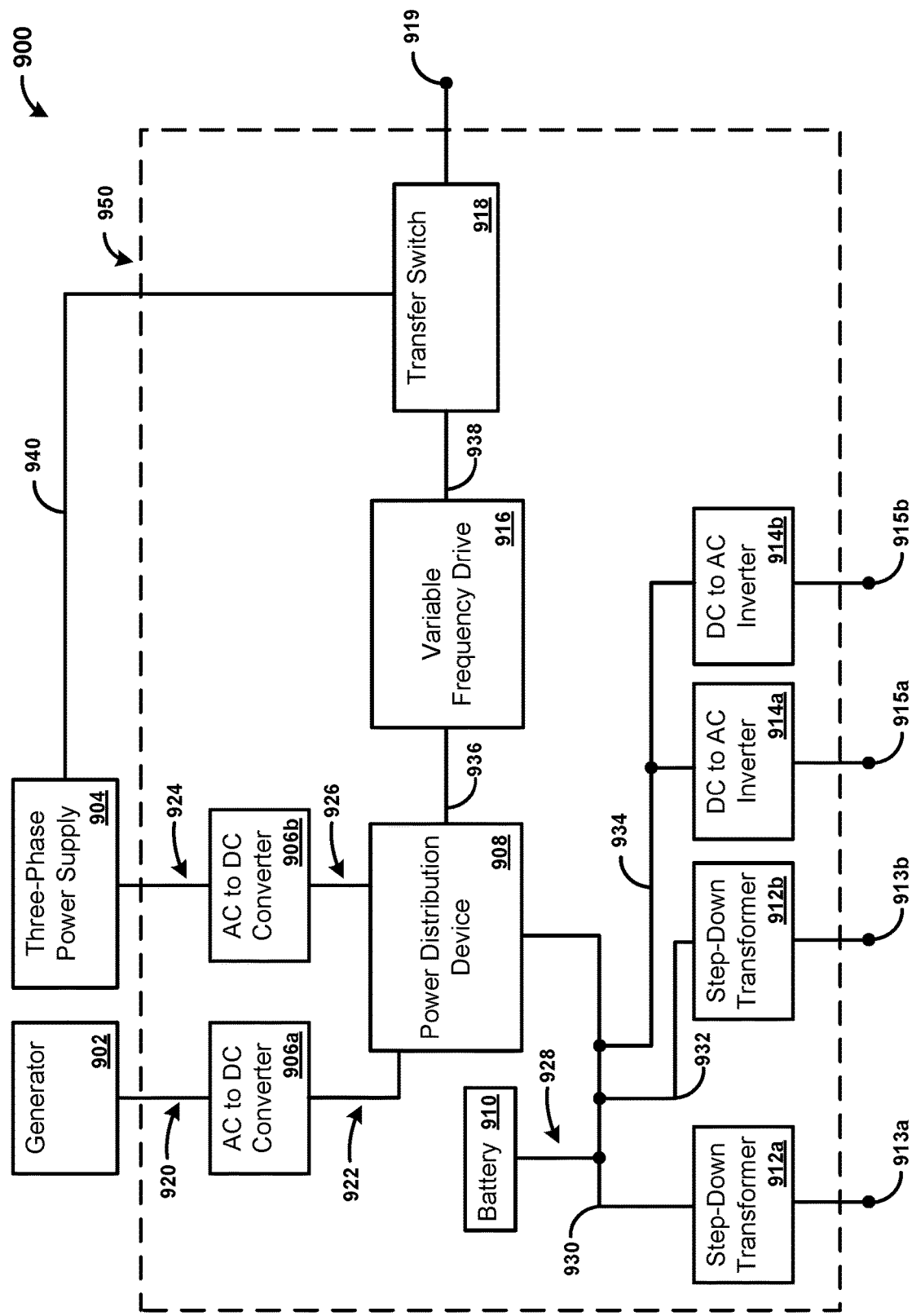
FIG. 9 illustrates an exemplary system for providing power.

FIG. 9 illustrates an exemplary system 900 for providing power. The system 900 has a generator 902, a three-phase power supply 904, AC to DC converters 906a,b, a power distribution device 908, a battery 910, a variable frequency drive 916, and a transfer switch 918. Additionally, the system 900 comprises step-down transformers 912a,b and DC to AC inverters 914a,b. Further, the system 900 comprises an apparatus 950. The apparatus 950 can comprise the AC to DC converters 906a,b, the power distribution device 908, the battery 910, the variable frequency drive 916, the transfer switch 918, the step-down transformers 912a,b, and the DC to AC inverters 914a,b. For example, the apparatus 950 can be a single device (e.g., enclosure) that comprises the components of the system 900 except for the generator 902 and the three-phase power supply 904.

The generator 902 can be any generator capable of providing power. For example, the generator 902 can be capable of producing Alternating Current (AC). The generator 902 can output between 100 VAC and 250 VAC, as well as higher voltages. For example, the generator 902 can output 120 VAC and/or 240 VAC. The generator 902 can provide (e.g., output) power to the AC to DC converter 906a via an electrical connection 920. For example, the generator 902 can provide AC power to the AC to DC converter 906a via the electrical connection 920.

The generator 902 can operate on any suitable fuel, such as gasoline, diesel, Liquid Propane Gas (LPG), natural gas, and so forth. The generator 902 can operate on two or more fuels. For example, the generator 902 can be capable of operating on both gasoline and LPG. The generator 902 can be capable of switching between the two fuels either manually or automatically. As an example, the generator 902 can default to running on gasoline stored within a gas tank associated with the generator 902. Once the generator 902 runs out of gasoline within the gas tank, the generator 902 can switch over to the LPG. As another example, the generator 902 can switch between two or more LPG tanks coupled with the generator 902. That is, when a first of the two or more LPG tanks runs out of the LPG, the generator 902 can manually, or automatically, switch to a second of the two or more LPG tanks.

The three-phase power supply 904 can be any suitable three-phase power supply 904. For example, the three-phase power supply 904 can be coupled with a power distribution network that receives power from a power plant. The three-phase power supply 904 can output between 100 VAC and 480 VAC, as well as higher voltages. For example, the three-phase power supply 904 can output 120 VAC and/or 240 VAC. The three-phase power supply 904 can provide (e.g., output) power to the AC to DC converter 906b via an electrical connection 924. For example, the three-phase power supply 904 can provide AC power to the AC to DC converter 906b via the electrical connection 924.

The AC to DC converters 906a,b can convert AC power to DC power. For example, the AC to DC converters 906a,b can be rectifiers. The AC to DC converters 906a,b can receive power from the generator 902 and/or the three-phase power supply 904 via the electrical connections 920,924. For example, the AC to DC converter 906a can receive AC power from the generator 902, and the AC to DC converter 906b can receive AC power from the three-phase power supply 904. Specifically, the AC to DC converter 906a can receive AC power from the generator 902 via the electrical connection 920, and the AC to DC converter 906b can receive AC power from the three-phase power supply 904 via the electrical connection 924. The AC to DC converters 906a,b can convert the received AC power to DC power. The AC to DC converters 906a,b can provide (e.g., output) the DC power to the power distribution device 908. Specifically, the AC to DC converter 906a can provide AC power to the power distribution device 908 via the electrical connection 922, and the AC to DC converter 906b can provide AC power to the power distribution device 908 via the electrical connection 926.

The power distribution device 908 can be any device capable of distributing power. Specifically, the power distribution device 908 can be configured to receive power from the AC to DC converters 906a,b and to provide the received power to the battery 910, the step-down transformers 912a,b, the DC to AC inverters 914a,b, and/or the variable frequency drive 916. The power distribution device 908 can receive power from the generator 902 and/or the three-phase power supply 904 via the AC to DC converters 906a,b. The power distribution device 908 can receive 12 VDC 24 VDC, 48 VDC, 72 VDC, as well as voltages ranging from 100 VDC to 800 VDC. For example, the power distribution device 908 can receive DC power from the AC to DC converter 906*a* via the electrical connection 922, as well as receive DC power from the AC to DC converter 906*b* via the electrical connection 926. The power distribution device 908 can provide (e.g., output) the DC power to the battery 910 via an electrical connection 928. As an example, the power distribution device 908 can charge the battery 910 via the electrical connection 928. The power distribution device 908 can charge the battery 910, while also providing power to one or more additional devices. For example, the power distribution device 908 can provide power to the step-down transformers 912*a,b* and the DC to AC inverters 914*a,b*, while also charging the battery 910.

Further, the power distribution device 908 can receive DC power from the battery 910. For example, the power distribution device 908 can receive 12 VDC 24 VDC, 48 VDC, 72 VDC, as well as voltages ranging from 100 VDC to 800 VDC. The power distribution device 908 can invert (e.g., convert) the received DC power to AC power. That is, the power distribution device 908 can invert the DC power received from the battery 910, as well as the AC to DC converters 906*a,b*. The power distribution device 908 can output the inverted AC power. For example, the power distribution device 908 can output AC power between 0-800 VAC or any suitable output. In an exemplary embodiment, the power distribution device 908 can output between 110-240 VAC. The power distribution device 908 can provide the inverted AC power to the variable frequency drive 916 via an electrical connection 936. The power distribution device 908 can comprise an internal transfer switch. The internal transfer switch can be capable of auctioneering DC power that is received from the electrical connection 922 (e.g., that is provided by the AC to DC converter 906*a*), the electrical connection 926 (e.g., that is provided by the AC to DC converter 906*b*), and the electrical connection 928 (e.g., that is provided by the battery 910). Stated differently, the power distribution device 908 is capable of switching (e.g., automatically) between power inputs received from the AC to DC converter 906*a*, via the electrical connection 922; from the AC to DC converter 906*b*, via the electrical connection 926; and from the battery 910, via the electrical connection 928, in order to maintain a constant output to the variable frequency device 916 via the electrical connection 936. The power distribution device 908 can have one or more indicators that indicate the status of the power distribution device 908. For example, the power distribution device 908 can have one or more lights and/or displays that indicate the status of the inverter. In an exemplary embodiment, the lights comprise Light Emitting Diodes (LEDs).

The variable frequency drive 916 receives AC power from the power distribution device 908 via the electrical connection 936. The variable frequency drive 916 converts the AC power to three-phase AC power. That is, the variable frequency drive 916 receives single phase AC power from the power distribution device 908, and converts the single phase AC power to three-phase AC power. The variable frequency drive 916 can output the three-phase AC power to the transfer switch 906 via an electrical connection 938. The variable frequency drive 916 can provide AC power from 0-480 VAC. The operation of the variable frequency drive 916 can be modified by programming. For example, a ramp rate of the variable frequency drive 916 can be modified, as well as a terminal voltage of the variable frequency drive 916.

The transfer switch 918 can comprise any switch capable of switching between two or more power sources. As shown, the transfer switch 918 can receive power from the variable frequency drive 916, as well as the three-phase power supply 904. Specifically, the transfer switch 918 receives three-phase AC power from the variable frequency drive 916 via the electrical connection 938, and the transfer switch 918 receives three-phase AC power from the three-phase power supply 904 via the electrical connection 940. The transfer switch 918 can output the received power. Specifically, the transfer switch 918 can output the receive power to an output 919.

Additionally, the transfer switch 918 can switch between receiving power from the three-phase power supply 904, and the variable frequency drive 916. Stated differently, the transfer switch 918 can auctioneer between the three-phase power supply 904 and the variable frequency drive 916. That is, the transfer switch 918 can automatically switch between receiving power from the three-phase power supply 904 and the variable frequency drive 916. For example, if the three-phase power supply 904 is unable to provide power, the transfer switch 918 can switch to receiving power from the variable frequency drive 916. In this manner, the transfer switch 918 can continue to output power to the output 919 even if one of the power sources of the transfer switch 916 (e.g., the three-phase power supply 904, or the variable frequency drive 916) stops providing power to the transfer switch 918.

The battery 910 can be one or more batteries configured to store power, as well as provide the stored power. The battery 910 can provide DC power. The battery 910 can have an associated voltage, such as a 12 V, 24 V, 48 V, 125 V, 250 V, 400 V, etc. battery. Further, the battery 910 can have an output current. For example, the battery 910 can output 5 A, 50 A, 150 A, 300 A, etc. In an exemplary embodiment, the battery 910 can be a 12 V battery with a rated output of up to 150 A. In another exemplary embodiment, the battery 910 can be a 24 V and/or a 48 V battery with a rated output of up to 300 A. As a further exemplary embodiment, the battery 910 can be a 410 V battery. As will be appreciated by one skilled in the art, the battery 910 can be a battery with any voltage and/or current characteristics.

The battery 910 can be any battery, such as rechargeable batteries or non-rechargeable batteries. The battery 910 can be a Lithium Ion (Li+) battery, a lead acid (Pb) battery, a Lithium Iron Phosphate (LiFePo) battery, or any type of rechargeable battery. The battery 910 can be one or more batteries configured to store power from the power distribution device 908. For example, the battery 910 can receive power from the power distribution device 908 via the electrical connection 928 and store the power from the power distribution device 908. Stated differently, the power distribution device 908 can charge the battery 910 via the electrical connection 928. Additionally, the battery 910 can provide power to the power distribution device 908. For example, the battery 910 can discharge (e.g., provide power) to the power distribution device 908 via the electrical connection 928. Accordingly, the battery 910 is capable of receiving power from the power distribution device 908, as well as providing power to the power distribution device 908.

Further, the battery 910 can have an auxiliary output (not shown). The auxiliary output can be capable of receiving and/or providing DC power to another device. For example, an apparatus capable of running on DC power can be coupled to the battery 910 to receive power from the battery 910 via the auxiliary output. As an example, a light can be coupled to the battery 910. As another example, an apparatus capable of providing DC power can be coupled to the battery

910. As an example, a maintenance battery charger can be coupled to the battery 910 via the auxiliary output to charge the battery 910.

The step-down transformers 912*a,b* can reduce (e.g., step-down) the power provided by the power distribution device 908 and/or the battery 910 to provide a lower power to one or more devices that require a different voltage than the voltage output by the power distribution device 908 and/or the battery 910. That is, the step-down transformers 912*a,b* step-down the voltage provided by the power distribution device 908 and/or the battery 910 to provide a step-downed voltage to outputs 913*a,b*. The step-down transformer 912*a* can receive DC power via the electrical connection 930 and provide the stepped-down voltage to the output 913*a*. The step-down transformer 912*b* can receive DC power via the electrical connection 932 and provide the stepped-down voltage to the output 913*b*. The outputs 913*a,b* can receive power from the power distribution device 908, and step-down the received DC power to provide a lower power output on the outputs 913*a,b*. Additionally, the outputs 913*a,b* can receive DC power from the battery 910 and step-down the received DC power to provide a lower power output on the outputs 913*a,b*. The outputs 913*a,b* can output voltages of 12 VDC 24 VDC, 48 VDC, 72 VDC, as well as voltages ranging from 100 VDC to 800 VDC. In an exemplary embodiment, one of the outputs 913*a,b* outputs 125 VDC, while the other output outputs 250 VDC. The step-down transformers 912*a,b* can have one or more indicators that indicate the status of the step-down transformers 912*a,b*. For example, the step-down transformers 912*a,b* can have one or more lights and/or displays that indicate the status of the step-down transformers 912*a,b*. In an exemplary embodiment, the lights comprise Light Emitting Diodes (LEDs).

The DC to AC inverters 914*a,b* can receive DC power from the power distribution device 908 and/or the battery 910. The DC to AC inverters 914*a,b* can receive DC power from the power distribution device 908 and/or the battery 910 via an electrical connection 934. For example, the DC to AC inverters 914*a,b* can receive 12 VDC 24 VDC, 48 VDC, 72 VDC, as well as voltages ranging from 100 VDC to 800 VDC. The DC to AC inverters 914*a,b* can invert (e.g., convert) the received DC power to AC power. The DC to AC inverters 914*a,b* can output the inverted AC power. For example, the DC to AC inverters 914*a,b* can output the inverted AC power. For example, the DC to AC inverters 914*a,b* can output AC power between 0-800 VAC or any suitable output. In an exemplary embodiment, the power distribution device 908 can output between 110-240 VAC. The DC to AC inverter 914*a* can provide the inverted AC power to a device via an output 915*a*, and the DC to AC inverter 914*b* can provide the inverted AC power to a device via an output 915*b*. The DC to AC inverters 914*a,b* can have one or more indicators that indicate the status of the DC to AC inverters 914*a,b*. For example, the DC to AC inverters 914*a,b* can have one or more lights and/or displays that indicate the status of the DC to AC inverters 914*a,b*. In an exemplary embodiment, the lights comprise Light Emitting Diodes (LEDs).

While the electrical connections 920-940 are generally shown as direct connections between the various components of the system 900 for ease of explanation, a person skilled in the art would appreciate that the electrical connections 920-940 can comprise additional components, such as resistors, capacitors, inductors, breakers, switches, and so forth.

Figure 10:
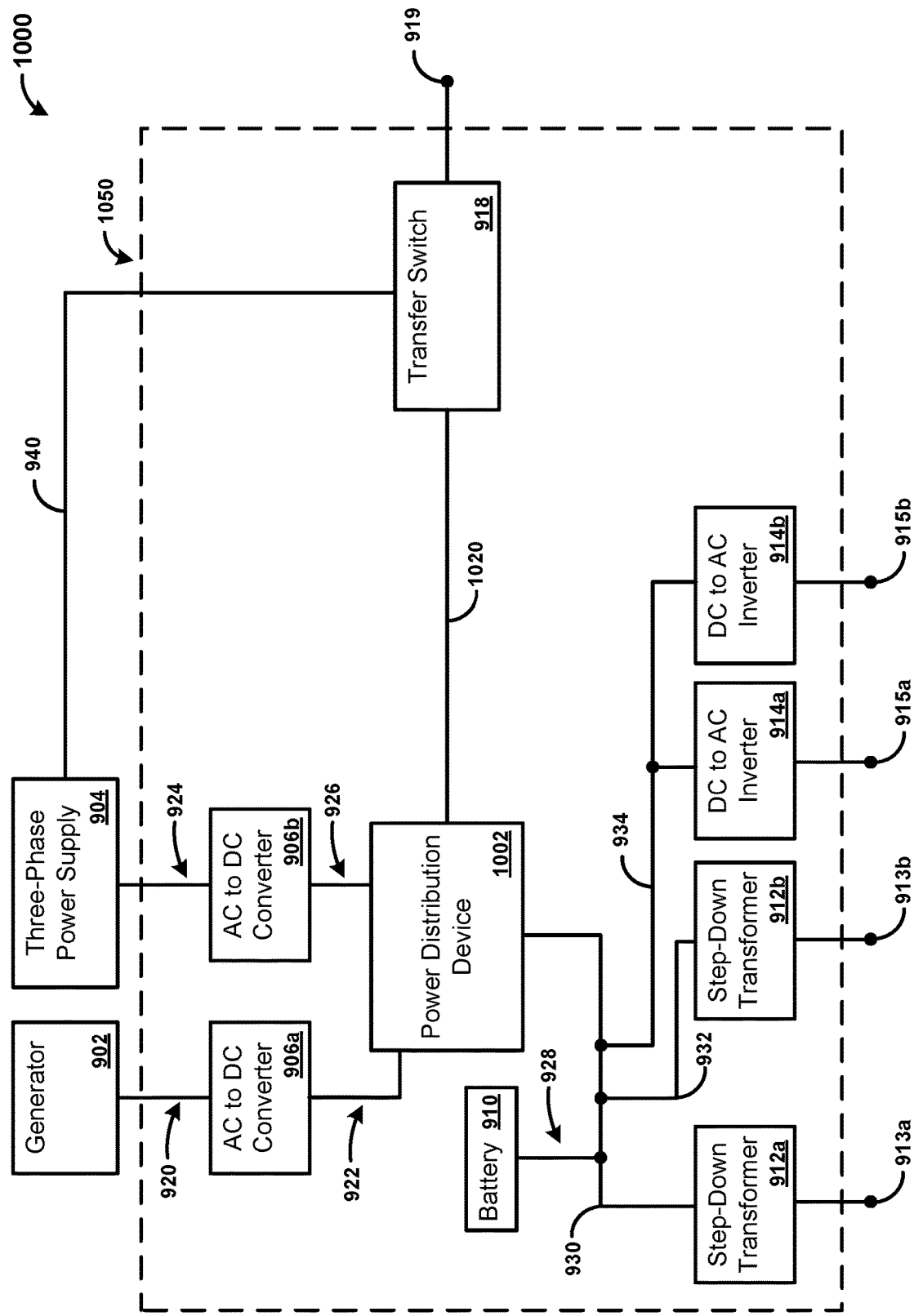
FIG. 10 illustrates an exemplary system for providing power.

FIG. 10 illustrates an exemplary system 1000 for providing power. Specifically, as is explained in more detail below, the system 1000 is the same as system 900 of FIG. 9 except that the power distribution device 1002 comprises the functionality of the variable frequency drive of 916 of FIG. 9.

The power distribution device 1002 can be any device capable of distributing power. Specifically, the power distribution device 1002 can be configured to receive power from the AC to DC converters 906*a,b* and to provide the received power to the battery 910, the step-down transformers 912*a,b*, the DC to AC inverters 914*a,b*, and/or the variable frequency drive 916. The power distribution device 1002 can receive power from the generator 902 and/or the three-phase power supply 904 via the AC to DC converters 906*a,b*. The power distribution device 1002 can receive 12 VDC 24 VDC, 48 VDC, 72 VDC, as well as voltages ranging from 100 VDC to 800 VDC. For example, the power distribution device 1002 can receive DC power from the AC to DC converter 906*a* via the electrical connection 922, as well as receive DC power from the AC to DC converter 906*b* via the electrical connection 926. The power distribution device 1002 can provide (e.g., output) the DC power to the battery 910 via an electrical connection 928. As an example, the power distribution device 1002 can charge the battery 910 via the electrical connection 928. The power distribution device 1002 can charge the battery 910, while also providing power to one or more additional devices. For example, the power distribution device 1002 can provide power to the step-down transformers 912*a,b* and the DC to AC inverters 914*a,b*, while also charging the battery 910.

Further, the power distribution device 1002 can receive DC power from the battery 910. For example, the power distribution device 1002 can receive 12 VDC 24 VDC, 48 VDC, 72 VDC, as well as voltages ranging from 100 VDC to 800 VDC. The power distribution device 1002 can invert (e.g., convert) the received DC power to AC power. That is, the power distribution device 1002 can invert the DC power received from the battery 910, as well as the AC to DC converters 906*a,b*. The power distribution device 1002 can output the inverted AC power. For example, the power distribution device 1002 can output 110 VAC, 120 VAC, or any suitable output AC output. The power distribution device 1002 can provide the inverted AC power to the transfer switch 1016 via an electrical connection 1020. The power distribution device 1002 can comprise an internal transfer switch. The internal transfer switch can be capable of auctioneering DC power that is received from the electrical connection 922 (e.g., that is provided by the AC to DC converter 906*a*), the electrical connection 926 (e.g., that is provided by the AC to DC converter 906*b*), and the electrical connection 928 (e.g., that is provided by the battery 910). Stated differently, the power distribution device 908 is capable of switching (e.g., automatically) between power inputs received from the AC to DC converter 906*a*, via the electrical connection 922; from the AC to DC converter 906*b*, via the electrical connection 926; and from the battery 910, via the electrical connection 928, in order to maintain a constant output to the transfer switch 1016 via an electrical connection 1020. The power distribution device 1002 can have one or more indicators that indicate the status of the power distribution device 1002. For example, the power distribution device 1002 can have one or more lights and/or displays that indicate the status of the inverter. In an exemplary embodiment, the lights comprise Light Emitting Diodes (LEDs).

The power distribution device 1002 can be capable of outputting three-phase AC power. That is, the power distribution device 1002 can invert the received DC power to AC and convert the inverted AC power to three-phase AC power, and output the three-phase AC power to the transfer switch 1016 via the electrical connection 1020. The power distribution device 1002 can provide three-phase AC power from 0-480 VAC. The operation of the power distribution device 1002 can be modified by programming. For example, a ramp rate of the power distribution device 1002 can be modified, as well as a terminal voltage of the power distribution device 1002.

While the electrical connections 1020-1038 are generally shown as direct connections between the various components of the system 1000 for ease of explanation, a person skilled in the art would appreciate that the electrical connections 1020-1038 can comprise additional components, such as resistors, capacitors, inductors, breakers, switches, and so forth.

Figure 11:
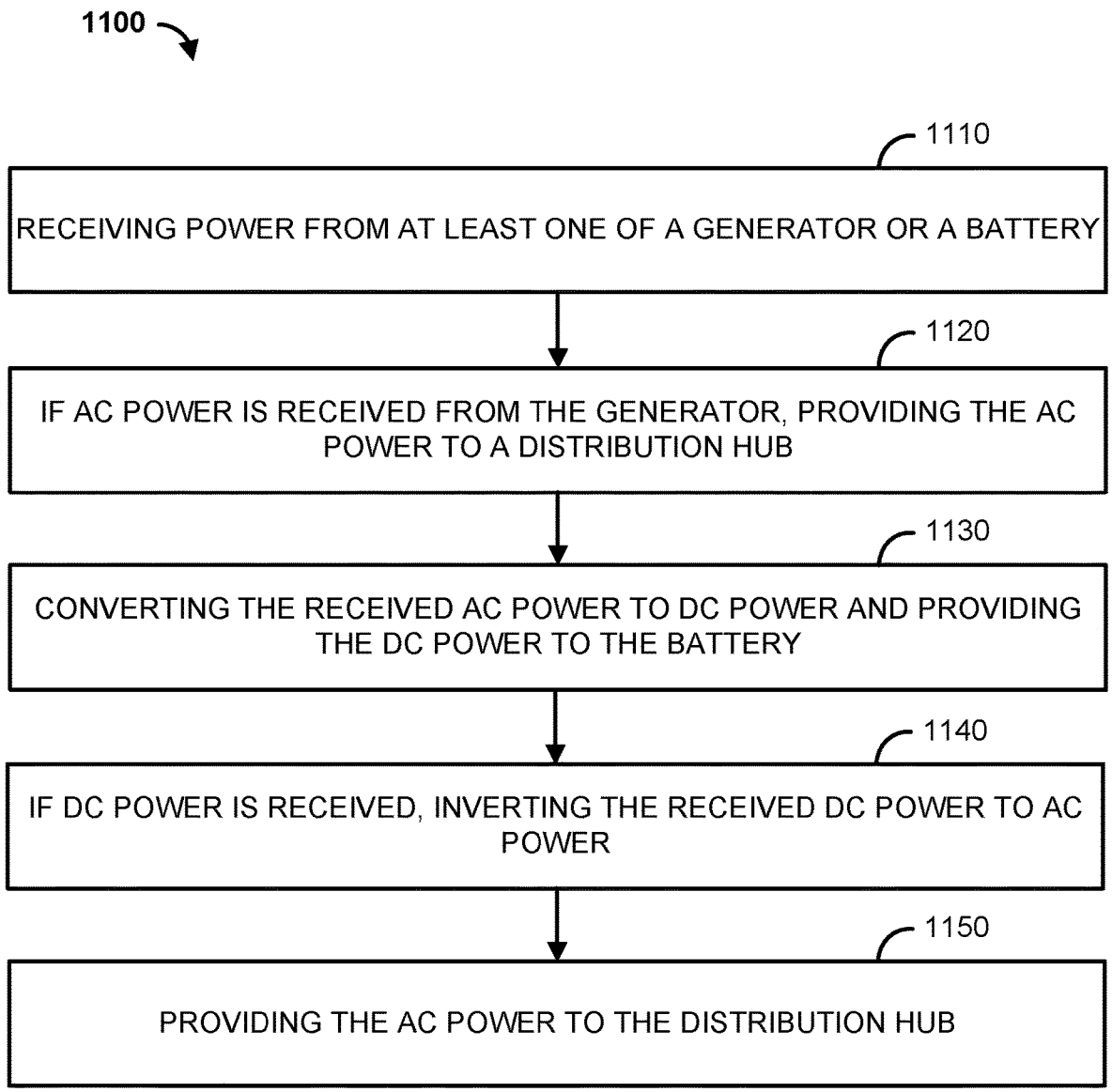
FIG. 11 illustrates a flowchart of an exemplary method for providing power.

FIG. 11 illustrates a flowchart of an exemplary method 1100 for providing power. At step 1110, power is received from at least one of a generator (e.g., the generator 202 of FIGS. 2-5, the generator 702 of FIGS. 7 & 8, and/or the generator 902 of FIGS. 9 & 10) or a battery (e.g., the battery 206 of FIGS. 2-5, the battery 602 of FIG. 6, the battery 710 of FIGS. 7 & 8, and/or the battery 910 of FIGS. 9 & 10). The power can be received from the generator or the battery by an inverter (e.g., the inverter 204 of FIGS. 2-5, the inverter 604 of FIG. 6, the inverter 708 of FIG. 7, the inverter 802 of FIG. 8, the power distribution device 908 of FIG. 9, and/or the power distribution device 1002 of FIG. 10).

At step 1120, if AC power is received from the generator, providing the AC power to a distribution hub (e.g., the distribution hub 208 of FIG. 2, the control module). For example, the inverter can receive the AC power from the generator, and provide the AC power to the distribution hub. As another example, the generator can provide the AC power directly to the distribution hub. The distribution hub may provide the power to one or more devices. For example, the distribution hub can provide the power to one or more power providing devices (e.g., the power providing device 216*a,b* of FIG. 2).

At step 1130, the received AC power is converted to DC power, and the DC power is provided to the battery. For example, the inverter can convert the AC power to DC power, and provide the DC power to the battery. The battery can receive the DC power, and can charge the battery with the received DC power. The battery can provide power to one or more devices. For example, the battery can provide power to one or more devices coupled with an auxiliary output of the battery (e.g., the auxiliary output 210 of FIG. 2).

At step 1140, if DC power is received, the received DC power is inverted to AC power. The DC power can be received from the battery by the inverter. The inverter can convert the received DC power to AC power. For example, if the generator is unable to provide power, the inverter may switch to receiving power from the battery.

At step 1150, the AC power can be provided to the distribution hub. The inverter can provide the AC power to the distribution hub. The distribution hub may provide the power to one or more devices. For example, the distribution hub can provide the power to one or more power providing devices (e.g., the power providing device 216*a,b* of FIG. 2).

Figure 12:
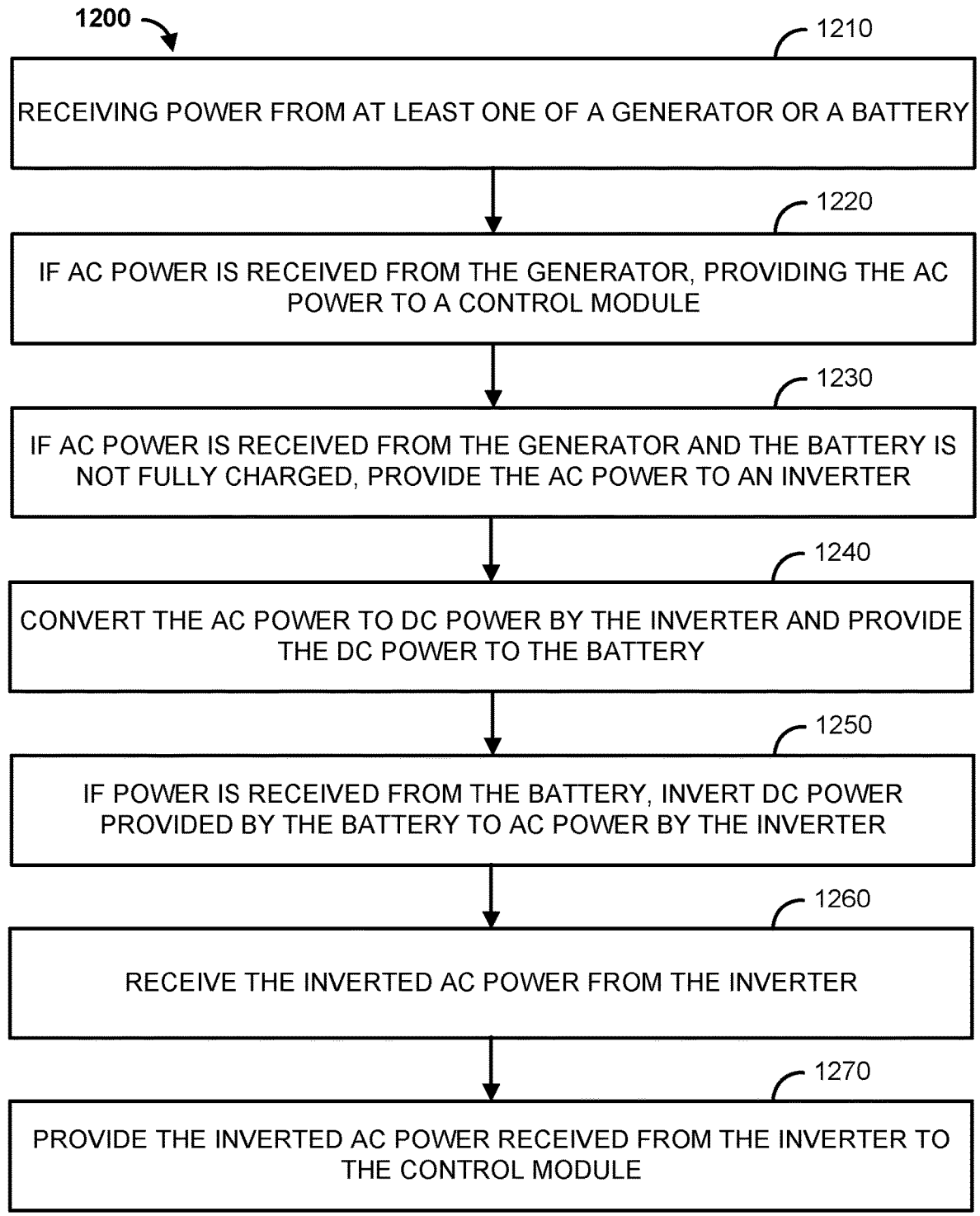
FIG. 12 illustrates a flowchart of an exemplary method for providing power.

FIG. 12 illustrates a flowchart of an exemplary method 1200 for providing power. At step 1210, power is received from at least one of a generator (e.g., the generator 202 of FIGS. 2-5, the generator 702 of FIGS. 7 & 8, and/or the generator 902 of FIGS. 9 & 10) or a battery (e.g., the battery 206 of FIGS. 2-5, the battery 602 of FIG. 6, the battery 710 of FIGS. 7 & 8, and/or the battery 910 of FIGS. 9 & 10). The power can be received from the generator or the battery by a transfer switch (e.g., the transfer switch 302 of FIG. 3-5).

At step 1220, if AC power is received from the generator, providing the AC power to a control module (e.g., the control module 304 of FIG. 3, the control module 402 of FIG. 4, the control module 502 of FIG. 5). For example, the transfer switch can receive the AC power from the generator, and provide the AC power to the control module. As another example, the generator can provide the AC power directly to the control module. The control module may provide the power to one or more devices. For example, the control module can provide DC power to one or more devices, as well as can provide AC power to one or more devices.

At step 1230, if AC power is received from the generator and the battery is not fully charge, the AC power is provided to an inverter (e.g., the inverter 204 of FIGS. 2-5, the inverter 604 of FIG. 6, the inverter 708 of FIG. 7, the inverter 802 of FIG. 8, the power distribution device 908 of FIG. 9, and/or the power distribution device 1002 of FIG. 10). For example, the transfer switch can provide the power to the inverter.

At step 1240, the AC power is converted to DC power by the inverter, and the DC power is provided to the battery. For example, the inverter can convert the AC power to DC power, and provide the DC power to the battery. The battery can receive the DC power, and can charge the battery with the received DC power. The battery can provide power to one or more devices. For example, the battery can provide power to one or more devices coupled with an auxiliary output of the battery (e.g., the auxiliary output 210 of FIG. 2).

At step 1250, if DC power is received, the received DC power is inverted to AC power. The DC power can be received from the battery by the inverter. The inverter can convert the received DC power to AC power. For example, if the generator is unable to provide power, the inverter may switch to receiving power from the battery. The inverter may output the inverted AC power. For example, the inverter may output the inverted AC power to the transfer switch.

At step 1260, the inverted AC power is received from the inverter. For example, the transfer switch receives the inverted AC power from the inverter. At step 1270, the AC power can be provided to the control module. The transfer switch can provide the inverted AC power received from the inverter to the control module. The control module may provide the power to one or more devices. For example, the control module can provide the power to one or more power providing devices (e.g., the power providing device 216*a,b* of FIG. 2). Additionally, the control module can output either DC power, AC power, and/or three-phase power via an output (e.g., the output 310 of FIG. 3; the DC outputs 406*a,b* of FIG. 4; the AC single phase output 506*a*, and/or the three-phase AC output 506*b* of FIG. 5).

Figure 13:
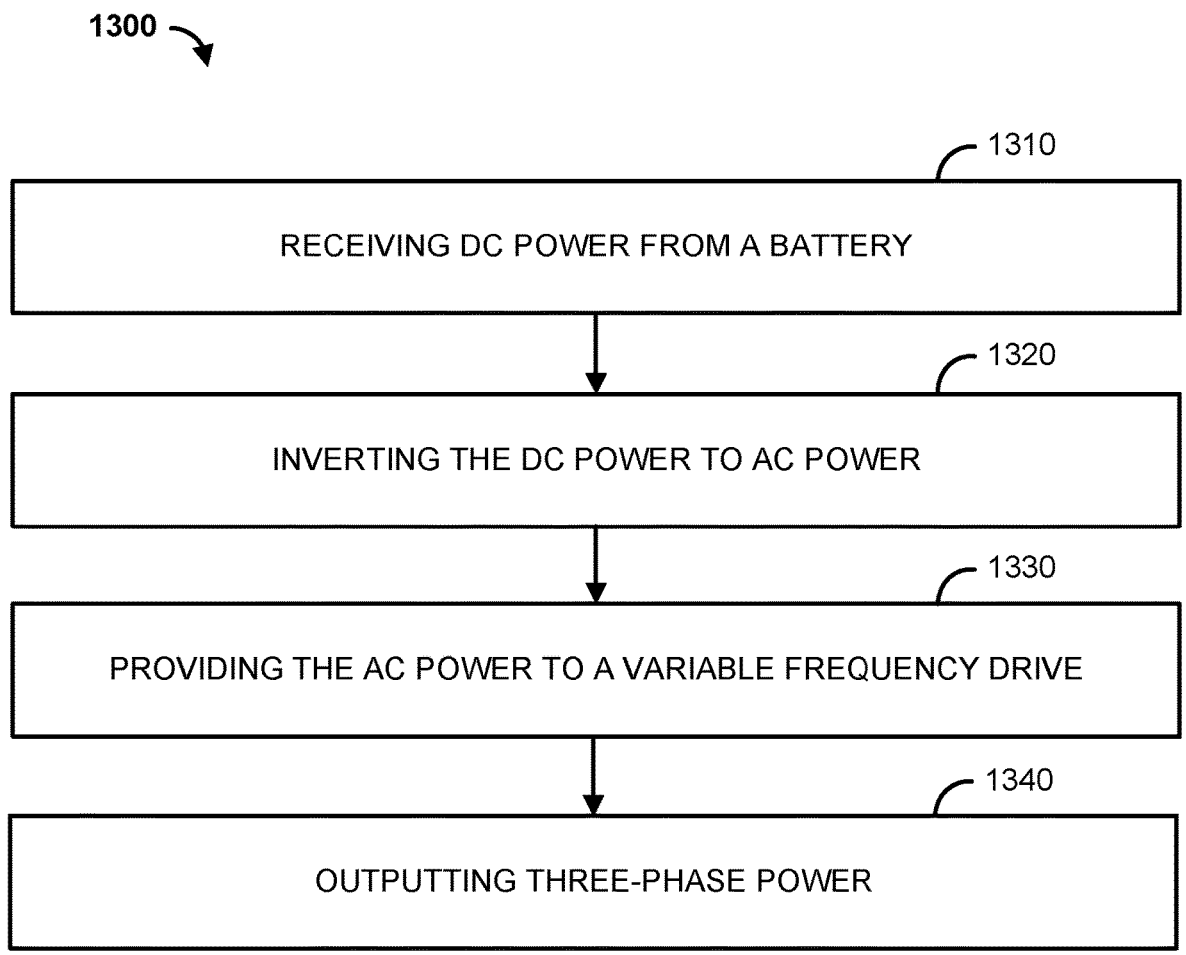
FIG. 13 illustrates a flowchart of an exemplary method for providing power.

FIG. 13 illustrates a flowchart of an exemplary method 1300 for providing power. At step 1310, DC power is received from a battery (e.g., the battery 602 of FIG. 6). For example, the DC power can be received by an inverter (e.g., the inverter 604 of FIG. 6). At step 1320, the DC power can be inverted to AC power. For example, the DC power can be inverted to AC power by the inverter. At step 1330, the AC power can be provided to a variable frequency drive (e.g., the variable frequency drive 606 of FIG. 6.) For example, the inverter can provide the AC power to the variable frequency device. The variable frequency drive can convert the received AC power from single-phase AC power to three-phase AC power. At step 1340, three-phase power is output. For example, the variable frequency drive can output the three-phase power.

Figure 14:
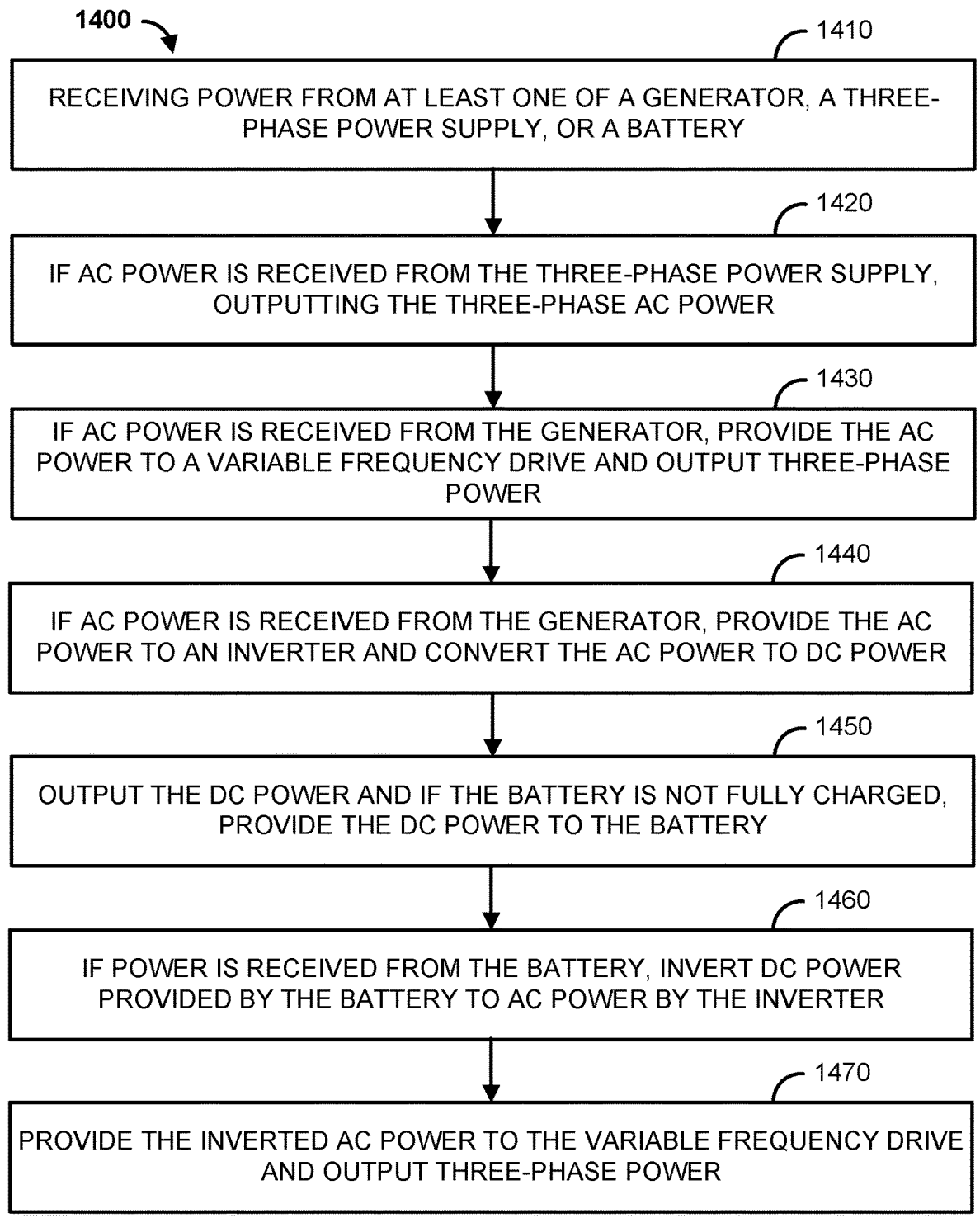
FIG. 14 illustrates a flowchart of an exemplary method for providing power.

FIG. 14 illustrates a flowchart of an exemplary method 1400 for providing power. At step 1410, power is received from at least one of a generator (e.g., the generator 702 of FIGS. 7 & 8), a three-phase power supply (e.g., the three-phase power supply 704 of FIGS. 7 & 8) or a battery (e.g., the battery 710 of FIGS. 7 & 8). The power can be received from the generator, the three-phase power supply, or the battery by a transfer switch (e.g., the transfer switch 706 of FIGS. 7 & 8).

At step 1420, if AC power is received from the three-phase power supply, the received three-phase power is output. For example, the transfer switch (e.g., the transfer switch 706 of FIGS. 7 & 8) may output the three-phase power.

At step 1430, if AC power is received from the generator, the received AC power is provided to a variable frequency drive (e.g., the variable frequency drive 716 of FIG. 7) and the three-phase power is output. For example, the inverter can provide AC power to the variable frequency drive, which converts the single-phase AC power to three-phase AC power. The variable frequency drive can output the three-phase AC power. The variable frequency drive can output the three-phase AC power to one or more devices.

At step 1440, if AC power is received from the generator, providing the AC power to an inverter (e.g., the inverter 708 of FIG. 7 and/or the inverter 802 of FIG. 8). For example, the transfer switch can receive the AC power from the generator, and provide the AC power to the inverter. The inverter can convert the received AC power to DC power. The inverter may provide the power to one or more devices. For example, the inverter can convert the AC power to DC power, and provide the DC power to the battery The battery can receive the DC power, and can charge the battery with the received DC power. The battery can provide power to one or more devices. For example, the battery can provide power to one or more devices coupled with an auxiliary output of the battery (e.g., the auxiliary output 210 of FIG. 2).

At step 1450, the DC Power is output, and if the battery is not fully charged, provide the DC power to the battery. The DC power may be output to one or more devices. For example, the DC power may be output to a step-down transformer (e.g., the step-down transformers 712a,b of FIGS. 7 & 8) or to a DC to AC inverter (e.g., the DC to AC inverters 714a,b of FIGS. 7 & 8).

At step 1460, if power is received from the battery, the received DC power is inverted to AC power by the inverter. The inverter can provide the inverted AC power to one or more devices. For example, the inverter can provide the inverted AC power to the variable frequency drive. At step 1470, the variable frequency drive can receive the inverted AC power from the inverter. The variable frequency drive can convert the single-phase AC power to three-phase AC power. The variable frequency drive can output the three-phase AC power. The variable frequency drive can output the three-phase AC power to one or more devices.

Figure 15:
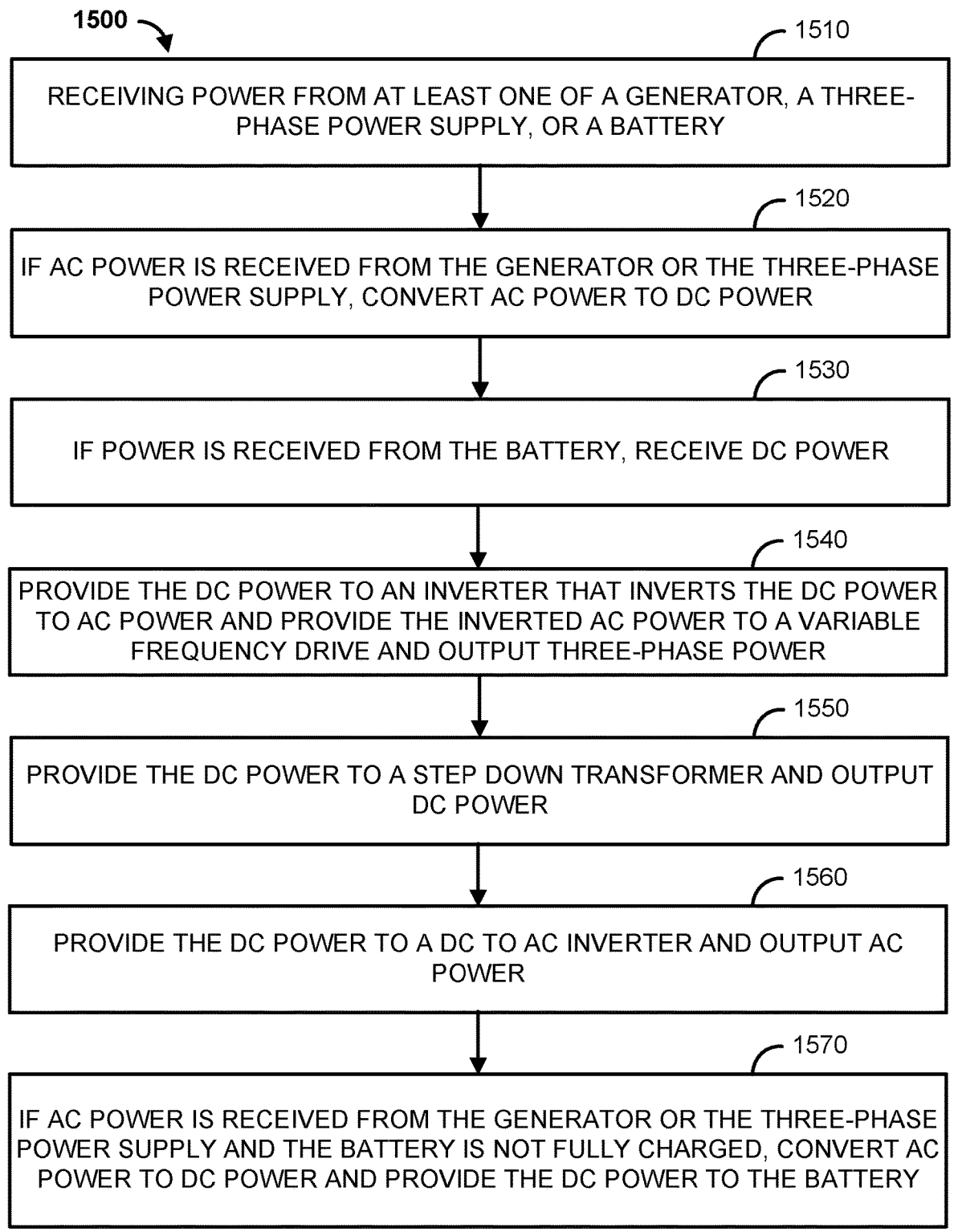
FIG. 15 illustrates a flowchart of an exemplary method for providing power.

FIG. 15 illustrates a flowchart of an exemplary method 1500 for providing power. At step 1510, power is received from at least one of a generator (e.g., the generator 902 of FIGS. 9 & 10), a three-phase power supply (e.g., the three-phase power supply 904 of FIGS. 9 & 10) or a battery (e.g., the battery 910 of FIGS. 9 & 10). The power can be received from the generator, the three-phase power supply, or the battery by a transfer switch (e.g., the transfer switch 706 of FIGS. 7 & 8). The power can be received from the generator, the three-phase power supply, or the battery by a power distribution device (e.g., the power distribution device 908 of FIGS. 9 & 10).

At step 1520, if AC power is received from the generator or the three-phase power supply, the AC power is converted to DC power. For example, the generator or the three-phase power supply can provide the AC power to the power distribution device (e.g., the power distribution device 908 of FIG. 9 and/or the power distribution device 1002 of FIG. 10). The power distribution device can convert the AC power to DC power.

The AC power can be provided to an inverter (e.g., the inverter 708 of FIG. 7, the inverter 802 of FIG. 8, the power distribution device 908 of FIG. 9, and/or the power distribution device 1002 of FIG. 10). For example, the transfer switch can receive the AC power from the generator, and provide the AC power to the inverter. The inverter can convert the received AC power to DC power. The inverter may provide the power to one or more devices. For example, the inverter can convert the AC power to DC power, and provide the DC power to the battery The battery can receive the DC power, and can charge the battery with the received DC power. The battery can provide power to one or more devices. For example, the battery can provide power to one or more devices coupled with an auxiliary output of the battery (e.g., the auxiliary output 210 of FIG. 2).

At step 1530, if power is received from the battery, DC power is received. At step 1540, the received DC power can be inverted to AC power by the inverter. The inverter can provide the inverted AC power to one or more devices. For example, the inverter can provide the inverted AC power to the variable frequency drive. The variable frequency drive can receive the inverted AC power from the inverter. The variable frequency drive can convert the single-phase AC power to three-phase AC power. The variable frequency drive can output the three-phase AC power. The variable frequency drive can output the three-phase AC power to one or more devices.

At step 1550, the DC power can be provided to a step down transformer and output DC power. The DC power may be output to one or more devices. For example, the DC power may be output to a step-down transformer (e.g., the step-down transformers 912a,b of FIGS. 9 & 10).

At step 1560, the DC power is provided to a DC to AC inverter (e.g., the DC to AC inverters 914a,b of FIGS. 9 & 10). The DC to AC inverter may output the AC power. The DC to AC inverter may output the AC power to one or more devices.

At step 1570, if AC power is received from the generator or the three-phase power supply and the battery is not fully charged, the AC power is converted to DC Power and the DC power is provided to the battery. For example, the AC power received from the generator or the three-phase power supply can be provided to the inverter. The inverter can convert the received AC power to DC power. The inverter can provide the power to one or more devices. For example, the inverter can convert the AC power to DC power, and provide the DC power to the battery The battery can receive the DC power, and can charge the battery with the received DC power.

Figure 16:
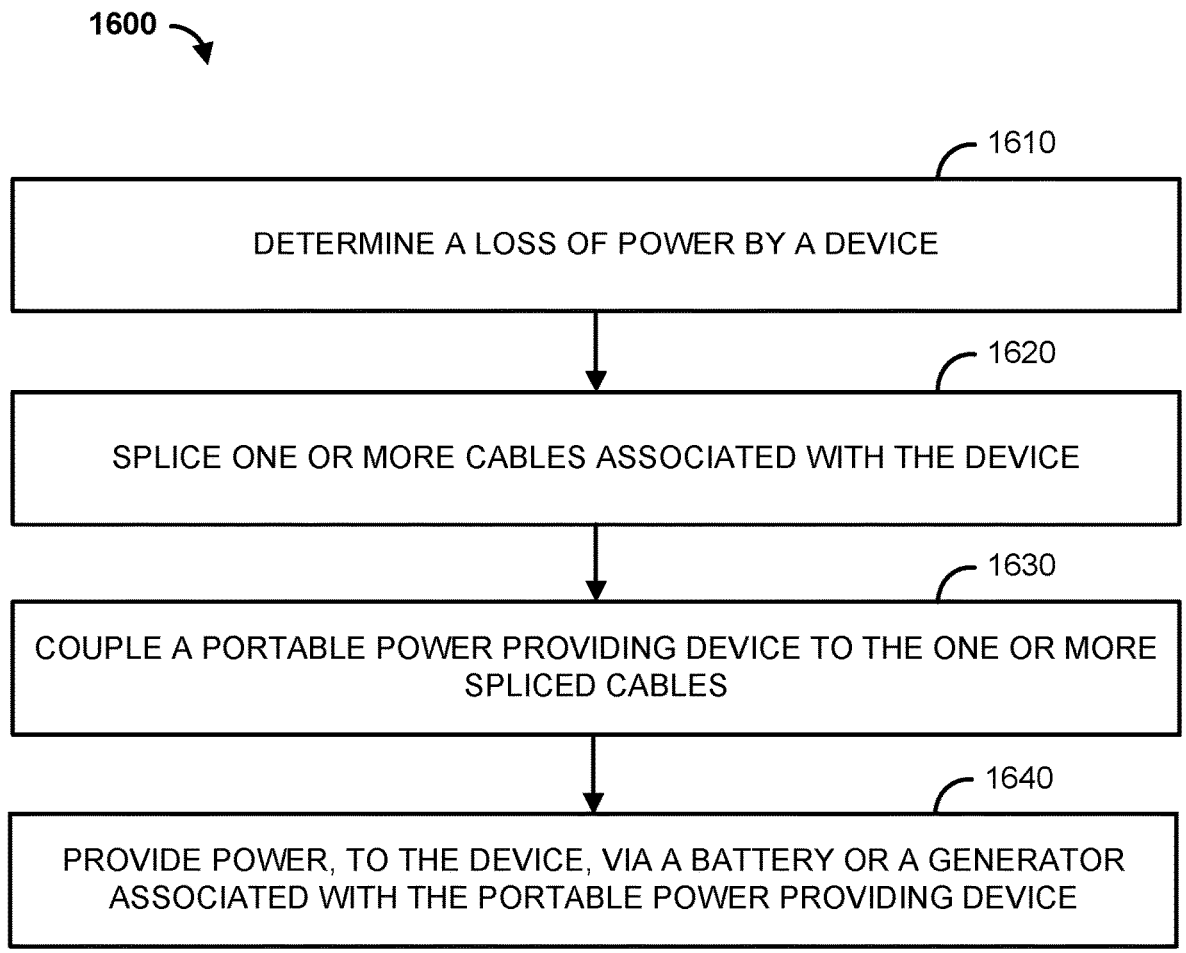
FIG. 16 illustrates a flowchart of an exemplary method for providing power.

FIG. 16 illustrates a flowchart of an exemplary method 1600 for providing power. At step 1610, determine the loss of power of a device. For example, a critical piece of equipment can lose power. At step 1620, one or more cables associated with the device are spliced. For example, the one or more cable may provide power to the device, and the one or more cables can be spliced by one or more cable clamps.

At step 1630, a portable power providing device (e.g., the system 100 of FIG. 1, the system 200 of FIG. 2, the system 300 of FIG. 3, the system 400 of FIG. 4, the system 500 of FIG. 5, the system 600 of FIG. 6, the system 700 of FIG. 7, the system 800 of FIG. 8, the system 900 of FIG. 9, and/or the system 1000 of FIG. 10) is coupled to the one or more spliced cables. For example, the portable power providing device can be electrically connected to the one or more cable clamps.

At step 1640, power is provided to the device via a battery (e.g., the battery 206 of FIGS. 2-5, the battery 602 of FIG. 6, the battery 710 of FIGS. 7 & 8, and/or the battery 910 of FIGS. 9 & 10) or a generator (e.g., the generator 202 of FIGS. 2-5, the generator 702 of FIGS. 7 & 8, and/or the generator 902 of FIGS. 9 & 10) associated with the portable power providing device.

Figure 17:
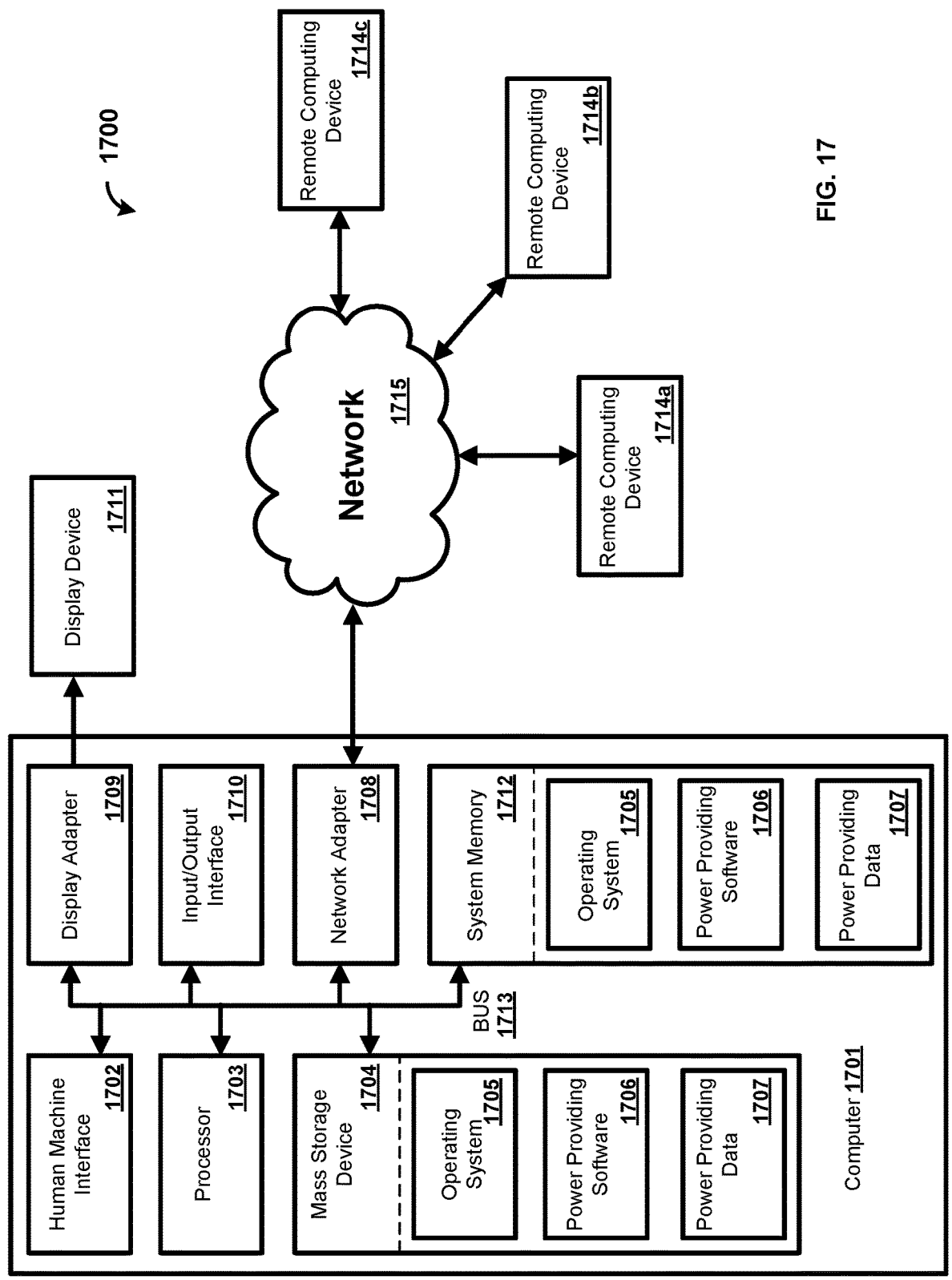
FIG. 17 illustrates a block diagram of an example computing device for providing power.

FIG. 17 shows an exemplary system 1700. The control module 102, the transfer switch 106, and/or the inverter 108 of FIG. 1; the inverter 204 and/or the distribution hub 208 of FIG. 2; the control module 304 of FIG. 3; the control module 402 of FIG. 4; and/or the control module 502 of FIG. 5; the inverter 604 and/or the variable frequency drive 606 of FIG. 6; the inverter 708, the transfer 706, and/or the variable frequency drive 716 of FIG. 7; the inverter 802 of FIG. 8; the power distribution device 908, the variable frequency drive 916, and/or the transfer switch 918 of FIG. 9; and/or the power distribution device 1002 of FIG. 10 may be a computer 1701 as shown in FIG. 17 or can be controlled by the computer 1701.

The computer 1701 may comprise one or more processors 1703, a system memory 1712, and a bus 1713 that couples various system components including the one or more processors 1703 to the system memory 1712. In the case of multiple processors 1703, the computer 1701 may utilize parallel computing. The bus 1713 is one or more of several possible types of bus structures, including a memory bus or memory controller, a peripheral bus, an accelerated graphics port, or local bus using any of a variety of bus architectures.

The computer 1701 may operate on and/or comprise a variety of computer readable media (e.g., non-transitory). The readable media may be any available media that is accessible by the computer 1701 and may include both volatile and non-volatile media, removable and non-removable media. The system memory 1712 has computer readable media in the form of volatile memory, such as random access memory (RAM), and/or non-volatile memory, such as read only memory (ROM). The system memory 1712 may store data such as the power data 1707 and/or program modules such as the operating system 1705 and the power software 1706 that are accessible to and/or are operated on by the one or more processors 1703.

The computer 1701 may also have other removable/non-removable, volatile/non-volatile computer storage media. FIG. 17 shows the mass storage device 1704 which may provide non-volatile storage of computer code, computer readable instructions, data structures, program modules, and other data for the computer 1701. The mass storage device 1704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 1704, such as the operating system 1705 and the power software 1706. Each of the operating system 1705 and the power software 1706 (or some combination thereof) may have elements of the program modules and the power software 1706. The power data 1707 may also be stored on the mass storage device 1704. The power data 1707 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 1715.

A user may enter commands and information into the computer 1701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1703 via a human machine interface 1702 that is coupled to the bus 1713, but may be connected by other interface and bus structures, such as a parallel port, game port, an IEEE 1394 Port (also known as a Firewire port), a serial port, network adapter 1708, and/or a universal serial bus (USB).

The display device 1711 may also be connected to the bus 1713 via an interface, such as the display adapter 1709. It is contemplated that the computer 1701 may have more than one display adapter 1709 and the computer 1701 may have more than one display device 1711. The display device 1711 may be a monitor, an LCD (Liquid Crystal Display), light emitting diode (LED) display, television, smart lens, smart glass, and/or a projector. In addition to the display device 1711, other output peripheral devices may be components such as speakers (not shown) and a printer (not shown) which may be connected to the computer 1701 via the Input/Output Interface 1710. Any step and/or result of the methods may be output (or caused to be output) in any form to an output device. Such output may be any form of visual representation, including, but not limited to, textual, graphical, animation, audio, tactile, and the like. The display device 1711 and computer 1701 may be part of one device, or separate devices.

The computer 1701 may operate in a networked environment using logical connections to one or more remote computing devices 1714a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1701 and a remote computing device 1714a,b,c may be made via a network 1715, such as a local area network (LAN) and/or a general wide area network (WAN). The network 1715 may utilize one or more communication protocols such as Wi-Fi, Bluetooth, or may be cellular network (e.g., a Long Term Evolution (LTE) network, a 4G network, a 5G network, etc.). Such network connections may be through the network adapter 1708. The network adapter 1708 may be implemented in both wired and wireless environments. Such networking environments are conventional and commonplace in dwellings, offices, enterprise-wide computer networks, intranets, and the Internet.

Application programs and other executable program components such as the operating system 1705 are shown herein as discrete blocks, although it is recognized that such programs and components reside at various times in different storage components of the computing device 1701, and are executed by the one or more processors 1703 of the computer. An implementation of the power software 1706 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

EMBODIMENTS

Embodiment 1. An apparatus, comprising: one or more batteries; a transfer switch, configured to: receive AC power from an external power source via a first electrical connection, provide AC power to an inverter via a second electrical connection, receive AC power from the inverter via a third electrical connection, provide AC power to an external device via a fourth electrical connection, and provide AC power to a control module via a fifth electrical connection; the inverter, configured to: receive DC power from the one or more batteries via a sixth electrical connection, invert the received DC power to AC power, and provide the AC power to the transfer switch via the third electrical connection; and the control module, configured to: control operation of the inverter, provide a first power output via a first output, and provide a second power output via a second output.

Embodiment 2. The apparatus of embodiment 1, wherein the first electrical output comprises AC power or DC power, and wherein the second power output comprises AC power or DC power.

Embodiment 3. The apparatus of embodiment 1, wherein the inverter is further configured to provide the AC power to the transfer switch via the third electrical connection when AC power is not present on the first electrical connection.

Embodiment 4. The apparatus of embodiment 1, wherein the transfer switch comprises an adjustable voltage proving time delay module configured to variably set at least one of a voltage delay trigger or a time delay trigger when AC power presence is detected on the first electrical connection, and wherein the transfer switch is further configured to override a power selection of the inverter.

Embodiment 5. The apparatus of embodiment 1, wherein when AC power is not available via the first electrical connection, the transfer switch is configured to provide the AC power to the control module via the fifth electrical connection.

Embodiment 6. The apparatus of embodiment 1, wherein the inverter is further configured to: receive an AC input from the second electrical connection, convert the received AC input to DC power, provide the DC power to the one or more batteries, wherein the one or more batteries are configured to be charged by the provided DC power.

Embodiment 7. The apparatus of embodiment 6, wherein the inverter is further configured to provide AC power to the transfer switch via the third electrical connection while simultaneously providing the DC power to the one or more batteries via the sixth electrical connection.

Embodiment 8. The apparatus of embodiment 1, wherein the external power source comprises an AC power generator configured to be powered by at least one of gasoline, liquid propane gas, natural gas, or diesel fuel.

Embodiment 9. The apparatus of embodiment 1, further comprising a wheeled container configured to hold the one or more batteries, the transfer switch, the inverter, and the control module.

Embodiment 10. The apparatus of embodiment 1, wherein at least one battery of the one or more batteries comprises an auxiliary port configured to provide external DC power or to receive external DC power, and wherein the one or more batteries comprise one or more of a Lithium Ion (Li+) battery, a lead acid (Pb) battery, or a Lithium Iron Phosphate (LiFePo) battery.

Embodiment 11. An apparatus, comprising: one or more batteries; an inverter, configured to: receive DC power from the one or more batteries via a first electrical connection, invert the received DC power to AC power, provide the inverted AC power to a distribution hub via a second electrical connection, receive AC power from an external power source via a third electrical connection, and provide the received AC power to the distribution hub via the second electrical connection, wherein the inverter is configured to auctioneer AC power from the first electrical connection and the third electrical connection; the distribution hub, configured to: receive AC power via the second electrical connection, provide a first power output via a first output, and provide a second power output via a second output.

Embodiment 12. The apparatus of embodiment 11, wherein the distribution hub comprises a voltage indicator configured to indicate an AC voltage received via the second electrical connection, and an ampere indicator configured to indicate an AC current passing through the distribution hub.

Embodiment 13. The apparatus of embodiment 11, further comprising a power providing device coupled to the first output via a cable, the power providing device configured to: receive power from the first output via the cable, provide DC power to a first output of the power providing device, and provide AC power to a second output of the power providing device.

Embodiment 14. The apparatus of embodiment 13, wherein a first power extension cable is coupled to the first output of the power providing device, and wherein a second power extension cable is coupled to the second output of the power providing device.

Embodiment 15. The apparatus of embodiment 13, wherein the first output of the power providing device comprises a first plurality of power outlets configured to couple to one or more electrical devices, and wherein the second output of the power providing device comprises a second plurality of power outlets configured to couple to the one or more electrical devices.

Embodiment 16. The apparatus of embodiment 11, wherein the external power source comprises an AC power generator configured to be powered by at least one of gasoline, liquid propane gas, natural gas, or diesel fuel.

Embodiment 17. The apparatus of embodiment 11, further comprising a wheeled container configured to hold the one or more batteries, the transfer switch, the inverter, and the distribution hub.

Embodiment 18. The apparatus of embodiment 11, wherein at least one battery of the one or more batteries comprises an auxiliary port configured to provide external DC power or to receive external DC power, and wherein the one or more batteries comprise one or more of a Lithium Ion (Li+) battery, a lead acid (Pb) battery, or a Lithium Iron Phosphate (LiFePo) battery.

Embodiment 19. The apparatus of embodiment 11, wherein the inverter is further configured to: receive an AC input from the second electrical connection, convert the received AC input to DC power, provide the DC power to the one or more batteries, wherein the one or more batteries are configured to be charged by the provided DC power.

Embodiment 20. The apparatus of embodiment 11, further comprising a removeably connected jumper cable, configured to: receive power from the external power source via a fourth electrical connection, and provide the received power to the distribution hub via a fifth electrical connection by bypassing the inverter.

Embodiment 21. An apparatus, comprising: one or more batteries; an inverter, configured to: receive DC power from the one or more batteries via a first electrical connection, invert the received DC power to AC power, provide the inverted AC power to a step-down transformer and a variable frequency drive via a second electrical connection; the step-down transformer, configured to: receive AC power from the inverter via the second electrical connection, reduce the received AC power to a lower AC voltage, and provide the reduced AC power to a first output; and a variable frequency drive, configured to: receive AC power from the inverter via a third electrical connection, convert the received AC power to three-phase AC power, and provide the three-phase AC power to a second output.

Embodiment 22. The apparatus of embodiment 21, further comprising a reversing contactor configured to: receive the three-phase AC power from the variable frequency drive, modify a phase of the three-phase AC power, and output the modified three-phase AC power to the second output.

Embodiment 23. The apparatus of embodiment 22, wherein the reversing contactor further comprises a switch, wherein the reversing contactor modifies the phase of the three-phase AC power based on the switch.

Embodiment 24. The apparatus of embodiment 21, wherein the variable frequency drive is further configured to limit an inrush current received via the second electrical output when a load coupled to the second output activates.

Embodiment 25. The apparatus of embodiment 21, wherein one or more operating parameters of the variable frequency drive can be modified, and wherein the one or more operating parameters comprise a ramp rate of the variable frequency drive and a terminal voltage of the variable frequency drive.

Embodiment 26. The apparatus of embodiment 21, wherein the inverter is further configured to provide AC power to the step-down transformer via the second electrical connection while simultaneously providing AC power the variable frequency drive via the third electrical connection.

Embodiment 27. The apparatus of embodiment 21, further comprising a container configured to hold the one or more batteries, the inverter, the step-down transformer, and the variable frequency drive.

Embodiment 28. The apparatus of embodiment 21, wherein at least one battery of the one or more batteries comprises an auxiliary port configured to provide external DC power or to receive external DC power, and wherein the one or more batteries comprise one or more of a Lithium Ion (Li+) battery, a lead acid (Pb) battery, or a Lithium Iron Phosphate (LiFePo) battery.

Embodiment 29. The apparatus of embodiment 21, further comprising a voltage indicator configured to indicate an AC voltage output via the first output, and an ampere indicator configured to indicate an AC current output via the first output.

Embodiment 30. The apparatus of embodiment 21, further comprising a voltage indicator configured to indicate a three-phase AC voltage output via the second output, and an ampere indicator configured to indicate a three-phase AC current output via the second output.

Embodiment 31. An apparatus, comprising: a transfer switch, configured to: receive AC power from an external power source via a first electrical connection, provide AC power to an inverter via a second electrical connection, receive AC power from an inverter via a third electrical connection, and provide AC power to an external device via a fourth electrical connection; the inverter, configured to: receive AC power from the transfer switch via the second electrical connection, convert the received AC power to DC power, and provide the converted DC power to one or more batteries, one or more step-down transformers, and one or more DC to AC inverters via a fifth electrical connection; and the one or more batteries, configured to: receive the converted DC power from the inverter via the fifth electrical connection, and provide DC power to the one or more step-down transformers, and provide DC power to the one or more DC to AC inverters.

Embodiment 32. The apparatus of embodiment 31, further comprising a variable frequency drive configured to: receive AC power from the inverter via a sixth electrical connection, convert the received AC power to three-phase AC power, and provide the three-phase AC power to the transfer switch via the third electrical connection.

Embodiment 33. The apparatus of embodiment 31, wherein the inverter is further configured to provide the AC power to the transfer switch via the third electrical connection when AC power is not present on the first electrical connection.

Embodiment 34. The apparatus of embodiment 31, wherein the inverter is further configured to: convert AC power to three-phase AC power, and provide the three-phase AC power to the transfer switch via the third electrical connection.

Embodiment 35. The apparatus of embodiment 31, wherein the transfer switch comprises an adjustable voltage proving time delay module configured to variably set at least one of a voltage delay trigger or a time delay trigger when AC power presence is detected on the first electrical connection, and wherein the transfer switch is further configured to override a power selection of the inverter.

Embodiment 36. The apparatus of embodiment 31, wherein the inverter is further configured to: receive DC power from the one or more batteries via the fifth electrical connection, invert the received DC power to AC power, and provide the AC power to the transfer switch via the third electrical connection.

Embodiment 37. The apparatus of embodiment 31, wherein the inverter is further configured to provide AC power to the transfer switch via the third electrical connection while simultaneously providing the DC power to the one or more batteries, the one or more step-down transformers, and the one or more DC to AC inverters via a second electrical connection via the fifth electrical connection.

Embodiment 38. The apparatus of embodiment 31, wherein the external power source comprises at least one of a three-phase power supply or an AC power generator configured to be powered by at least one of gasoline, liquid propane gas, natural gas, or diesel fuel.

Embodiment 39. The apparatus of embodiment 31, further comprising a wheeled container configured to hold the one or more batteries, the transfer switch, the inverter, the one or more step-down transformers, and the one or more DC to AC inverters; and wherein the one or more batteries comprise one or more of a Lithium Ion (Li+) battery, a lead acid (Pb) battery, or a Lithium Iron Phosphate (LiFePo) battery.

Embodiment 40. The apparatus of embodiment 31, wherein the one or more step-down transformers are configured to receive DC power, reduce the received DC power to a lower DC voltage, and provide the reduced DC power to a second output; and wherein the one or more DC to AC inverters are configured to receive DC power, convert the received DC power to AC power, and output the AC power to a third output.

Embodiment 41. An apparatus, comprising: one or more AC to DC converters configured to: receive AC power from an external power source, convert the AC power to DC power, and provide the converted DC power to a power distribution device via a first electrical connection; the power distribution device, configured to: receive the converted DC power from the one or more AC to DC converters via the first electrical connection, provide the converted DC power to one or more batteries, one or more step-down transformers, and one or more DC to AC inverters via a second electrical connection, invert the converted DC power to AC power, and provide the inverted AC power to a transfer switch via a third electrical connection; the one or more batteries, configured to: receive the converted DC power from the power distribution device via the second electrical connection, provide DC power to the one or more step-down transformers, and provide DC power to the one or more DC to AC inverters; and the transfer switch, configured to: receive the inverted AC power from the power distribution device via the third electrical connection, receive AC power from at least one of the external power source or the power distribution device, and provide the received AC power to an output.

Embodiment 42. The apparatus of embodiment 41, further comprising a variable frequency drive configured to: receive AC power from the power distribution device via a fourth electrical connection, convert the received AC power to three-phase AC power, and provide the three-phase AC power to the transfer switch via the third electrical connection.

Embodiment 43. The apparatus of embodiment 41, wherein the power distribution device is further configured to provide the AC power to the transfer switch via the third electrical connection when AC power is not present on the first electrical connection.

Embodiment 44. The apparatus of embodiment 41, wherein the power distribution device is further configured to: convert AC power to three-phase AC power, and provide the three-phase AC power to the transfer switch via the third electrical connection.

Embodiment 45. The apparatus of embodiment 41, wherein the inverter is further configured to: receive DC power from the one or more batteries via the second electrical connection, invert the received DC power to AC power, and provide the AC power to the transfer switch via the third electrical connection.

Embodiment 46. The apparatus of embodiment 41, wherein the power distribution device is further configured to provide AC power to the transfer switch via the third electrical connection while simultaneously providing the DC power to the one or more batteries, the one or more step-down transformers, and the one or more DC to AC inverters via the second electrical connection.

Embodiment 47. The apparatus of embodiment 41, wherein the external power source comprises at least one of a three-phase power supply or an AC power generator configured to be powered by at least one of gasoline, liquid propane gas, natural gas, or diesel fuel.

Embodiment 48. The apparatus of embodiment 47, further comprising: a first AC to DC converter of the one or more AC to DC converters configured to: receive AC power from the AC power generator, and provide DC power to the power distribution device via the first electrical connection; and a second AC to DC converter of the one or more AC to DC converters configured to: receive AC power from the three-phase power supply, and provide DC power to the power distribution device via a fifth electrical connection.

Embodiment 49. The apparatus of embodiment 41, further comprising a wheeled container configured to hold the one or more batteries, the transfer switch, the inverter, the one or more step-down transformers, and the one or more DC to AC inverters; and wherein the one or more batteries comprise one or more of a Lithium Ion (Li+) battery, a lead acid (Pb) battery, or a Lithium Iron Phosphate (LiFePo) battery.

Embodiment 50. The apparatus of embodiment 41, wherein the one or more step-down transformers are configured to receive DC power, reduce the received DC power to a lower DC voltage, and provide the reduced DC power to a second output; and wherein the one or more DC to AC inverters are configured to receive DC power, convert the received DC power to AC power, and output the AC power to a third output.

The invention claimed is:
1. An apparatus, comprising:
one or more batteries;
a transfer switch configured to:
receive AC power from an external power source via a first electrical connection,
provide AC power to an inverter via a second electrical connection,
receive AC power from the inverter via a third electrical connection,
provide AC power to an external device via a fourth electrical connection, and
provide AC power to a control module via a fifth electrical connection;
the inverter configured to:
receive DC power from the one or more batteries via a sixth electrical connection,
invert the DC power to AC power, and
provide the AC power to the transfer switch via the third electrical connection; and
the control module configured to:
control operation of the inverter, provide a first power output via a first output, and
provide a second power output via a second output.

2. The apparatus of claim 1, wherein the first power output comprises AC power or DC power, and wherein the second power output comprises AC power or DC power.

3. The apparatus of claim 1, wherein the inverter is further configured to provide the AC power to the transfer switch via the third electrical connection when AC power is not present on the first electrical connection.

4. The apparatus of claim 1, wherein the transfer switch comprises an adjustable voltage proving time delay configured to variably set at least one of a voltage delay trigger or a time delay trigger when AC power presence is detected on the first electrical connection, and wherein the transfer switch is further configured to override a power selection of the inverter.

5. The apparatus of claim 1, wherein when AC power is not available via the first electrical connection, the transfer switch is configured to provide the AC power to the control module via the fifth electrical connection.

6. The apparatus of claim 1, wherein the inverter is further configured to:
receive an AC input from the second electrical connection;
convert the AC input to DC power; and
provide the DC power to the one or more batteries, wherein the one or more batteries are configured to be charged by the DC power.

7. The apparatus of claim 6, wherein the inverter is further configured to provide AC power to the transfer switch via the third electrical connection while simultaneously providing the DC power to the one or more batteries via the sixth electrical connection.

8. The apparatus of claim 1, wherein the external power source comprises an AC power generator configured to be powered by at least one of gasoline, liquid propane gas, natural gas, or diesel fuel.

9. The apparatus of claim 1, further comprising a wheeled container configured to hold the one or more batteries, the transfer switch, the inverter, and the control module.

10. The apparatus of claim 1, wherein at least one battery of the one or more batteries comprises an auxiliary port configured to provide external DC power or to receive external DC power, and wherein the one or more batteries comprise one or more of a Lithium Ion (Li+) battery, a lead acid (Pb) battery, or a Lithium Iron Phosphate (LiFePo) battery.

11. The apparatus of claim 1, further comprising one or more high-voltage capacitors and a three-phase variable frequency drive (VFD), wherein the inverter is further configured to:
provide at least a portion of the AC power to at least one of the first output or the second output, wherein the at least the portion of the AC power is buffered through the one or more high-voltage capacitors to at least one of the first output or the second output; and
provide at least another portion of the AC power to the three-phase VFD, wherein the three-phase VFD is configured to send the at least the another portion of the AC power to at least one of the first output or the second output as three-phase AC power.

12. The apparatus of claim 1, further comprising a distribution hub, wherein the distribution hub comprises a voltage indicator configured to indicate an AC voltage received at at least one electrical connection of the apparatus, and an ampere indicator configured to indicate an AC current passing through the distribution hub.

13. The apparatus of claim 1, further comprising a power providing device coupled to the first output via a cable, the power providing device configured to:
receive power from the first output via the cable;
provide DC power to a first output of the power providing device; and
provide AC power to a second output of the power providing device.

14. The apparatus of claim 13, wherein a first power extension cable is coupled to the first output of the power providing device, and wherein a second power extension cable is coupled to the second output of the power providing device.

15. The apparatus of claim 13, wherein the first output of the power providing device comprises a first plurality of power outlets configured to couple to one or more electrical devices, and wherein the second output of the power providing device comprises a second plurality of power outlets configured to couple to the one or more electrical devices.

16. The apparatus of claim 1, wherein the inverter is further configured to:
receive an AC input from the second electrical connection;
convert the AC input to DC power; and
provide the DC power to the one or more batteries, wherein the one or more batteries are configured to be charged by the provided DC power.

17. The apparatus of claim 1, further comprising a removeably connected jumper cable, configured to:
receive power from the external power source; and
provide the power to a distribution hub by bypassing the inverter.

18. A method comprising:
configuring an inverter to:
receive DC power from one or more batteries,
invert the DC power to AC power, and
provide the AC power to a transfer switch;
configuring the transfer switch to:
receive the AC power, and
provide at least a portion of the AC power to an external device and at least another portion of the AC power to a control module; and
configuring the control module to:
control operation of the inverter,
provide a first power output via a first output, and
provide a second power output via a second output.

19. The method of claim 18, further comprising configuring the transfer switch to:
receive additional AC power from an external power source; and
provide the additional AC power to the inverter.

20. The method of claim 18, wherein the first power output comprises AC power or DC power, and wherein the second power output comprises AC power or DC power.

21. The method of claim 18, further comprising causing the inverter to provide the AC power to the transfer switch when AC power from an external power source is unavailable.

22. The method of claim 18, wherein the transfer switch comprises an adjustable voltage proving time delay configured to variably set at least one of a voltage delay trigger or a time delay trigger when the transfer switch receives AC power from an external power source.

23. The method of claim 18, further comprising configuring the transfer switch to override a power selection of the inverter.

24. The method of claim 18, further comprising configuring the transfer switch to provide at least a portion of the AC power to the control module when AC power from an external power source is unavailable.

25. The method of claim 18, further comprising configuring the inverter to:
    receive an AC input;
    convert the AC input to DC power; and
    provide the DC power to the one or more batteries to charge the one or more batteries.

26. The method of claim 18, further comprising configuring the inverter to simultaneously provide at least a portion of the AC power to the transfer switch while providing the DC power to the one or more batteries.

27. The method of claim 19, wherein the external power source comprises an AC power generator configured to be powered by at least one of gasoline, liquid propane gas, natural gas, or diesel fuel.

28. The method of claim 18, further configuring at least one of the one or more batteries, the transfer switch, the inverter, or the control module with a wheeled container.

29. The method of claim 18, wherein at least one battery of the one or more batteries comprises an auxiliary port, the method further comprising configuring the auxiliary port to at least one of provide external DC power or to receive external DC power.

30. The method of claim 18, wherein the one or more batteries comprise one or more of a Lithium Ion (Li+) battery, a lead acid (Pb) battery, or a Lithium Iron Phosphate (LiFePo) battery.

31. The method of claim 18, further comprising configuring the inverter to:
    provide at least a portion of the AC power to at least one of the first output or the second output, wherein the at least the portion of the AC power is buffered through one or more high-voltage capacitors to at least one of the first output or the second output; and
    provide at least another portion of the AC power to a three-phase variable frequency drive (VFD), wherein the three-phase VFD is configured to send the at least the another portion of the AC power to at least one of the first output or the second output as three-phase AC power.

32. The method of claim 18, further comprising configuring a voltage indicator of a distribution hub to indicate an AC voltage received at at least one electrical connection and an ampere indicator to indicate an AC current passing through the distribution hub.

33. The method of claim 18, further comprising coupling a power providing device to the first output via a cable and configuring the power providing device to:
    receive power from the first output via the cable;
    provide DC power to a first output of the power providing device; and
    provide AC power to a second output of the power providing device.

34. The method of claim 33, further comprising:
    coupling a first power extension cable to the first output of the power providing device; and
    coupling a second power extension cable to the second output of the power providing device.

35. The method of claim 33, wherein the first output of the power providing device comprises a first plurality of power outlets configured to couple to one or more electrical devices, and wherein the second output of the power providing device comprises a second plurality of power outlets configured to couple to the one or more electrical devices.

36. The method of claim 18, further comprising further configuring the inverter to:
    receive an AC input;
    convert the AC input to DC power; and
    provide the DC power to charge the one or more batteries.

37. The method of claim 19, further comprising:
    receiving, from the external power source via a removeably connected jumper cable, power; and
    providing the power to a distribution hub by bypassing the inverter.

* * * * *